US008773701B2

(12) United States Patent
Yano et al.

(10) Patent No.: US 8,773,701 B2
(45) Date of Patent: Jul. 8, 2014

(54) IMAGE PROCESSING APPARATUS, PRINT CONTROL METHOD, RECORDING MEDIUM STORING PRINT CONTROL PROGRAM

(75) Inventors: Shunsuke Yano, Kanagawa (JP); Yoshinori Fujita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 146 days.

(21) Appl. No.: 13/445,259

(22) Filed: Apr. 12, 2012

(65) Prior Publication Data
US 2012/0262742 A1 Oct. 18, 2012

(30) Foreign Application Priority Data

Apr. 15, 2011 (JP) ................................. 2011-090717

(51) Int. Cl.
*G06F 3/12* (2006.01)
(52) U.S. Cl.
USPC .......... 358/1.15; 358/1.9; 358/1.13; 358/1.14
(58) Field of Classification Search
None
See application file for complete search history.

(56) References Cited

U.S. PATENT DOCUMENTS

| | | | | |
|---|---|---|---|---|
| 7,679,776 B2* | 3/2010 | Nakagiri et al. | ............. | 358/1.18 |
| 7,872,771 B2* | 1/2011 | Kojima et al. | ............... | 358/1.15 |
| 7,929,167 B2* | 4/2011 | Kato | ............ | 358/1.15 |
| 8,035,839 B2* | 10/2011 | Shaw | ............ | 358/1.15 |
| 8,054,503 B2* | 11/2011 | Hiraike | ............ | 358/1.9 |
| 8,072,636 B2* | 12/2011 | Mizuno | ............ | 358/1.15 |
| 8,300,240 B2* | 10/2012 | Yokoyama | ............ | 358/1.14 |
| 8,325,370 B2* | 12/2012 | Hashimoto | ............ | 358/1.15 |
| 8,355,168 B2* | 1/2013 | Gotoh | ............ | 358/1.9 |
| 8,537,385 B2* | 9/2013 | Iizuka et al. | ............ | 358/1.15 |
| 2003/0202198 A1* | 10/2003 | North | ............ | 358/1.13 |
| 2006/0203256 A1* | 9/2006 | Hagiwara | ............ | 358/1.1 |
| 2007/0115493 A1* | 5/2007 | Haginaka et al. | ............ | 358/1.14 |
| 2008/0130042 A1* | 6/2008 | Iizuka et al. | ............ | 358/1.15 |
| 2009/0201551 A1* | 8/2009 | Uchida | ............ | 358/1.15 |
| 2010/0079805 A1* | 4/2010 | Hashimoto | ............ | 358/1.15 |
| 2011/0235114 A1* | 9/2011 | Saitoh et al. | ............ | 358/1.15 |

FOREIGN PATENT DOCUMENTS

JP 2010108470 A 5/2010
JP 2010191570 A 9/2010

* cited by examiner

*Primary Examiner* — Dung Tran
(74) *Attorney, Agent, or Firm* — Harness, Dickey & Pierce, P.L.C.

(57) ABSTRACT

An image processing apparatus includes a display unit; a screen control unit configured to control display of operation screens on the display unit so that there are more operation procedures for color printing compared to monochrome printing in printing operations performed by a user; a setting change unit configured to change a print setting of print data of a selected stored job, among stored jobs stored in a predetermined storage area, to monochrome or color when a print execution instruction is received, based on the print execution instruction received from an operation screen controlled and displayed by the screen control unit; and a print control unit configured to execute monochrome printing or color printing on the print data according to the print setting changed by the setting change unit.

13 Claims, 23 Drawing Sheets

FIG.4

| JOB IDENTIFICATION | USER IDENTIFICATION | JOB NAME | NUMBER OF PAGES | COLOR/ MONOCHROME | DOUBLE-SIDED/ SINGLE-SIDED | NUMBER OF COPIES | 90D |
|---|---|---|---|---|---|---|---|
| J001 | User01 | Test1.ppt | 5 | COLOR | SINGLE-SIDED | 1 | ..... |
| J002 | User02 | Test2.txt | 1 | MONOCHROME | DOUBLE-SIDED | 2 | ..... |
| J003 | User03 | Test3.ppt | 10 | COLOR | SINGLE-SIDED | 1 | ..... |
| J004 | User04 | Test4.doc | 3 | COLOR | SINGLE-SIDED | 1 | ..... |
| ..... | ..... | ..... | ..... | ..... | ..... | ..... | ..... |

| USER IDENTIFICATION | USAGE UPPER LIMIT (UPPER LIMIT OF NUMBER OF TIMES OF USAGE) | USAGE STATUS (NUMBER OF TIMES OF USAGE) |
|---|---|---|
| User01 | 100 | 66 |
| User02 | 100 | 100 |
| User03 | 50 | 48 |
| User04 | 25 | 12 |
| ..... | ..... | ..... |

FIG.15

| DETERMINATION CONDITION (NUMBER OF PAGES:X) | OPERATION PROCEDURE |
|---|---|
| X = 1 | (PRESS COLOR PRINTING BUTTON) |
| 1 < X ≤ 100 | (PRESS COLOR PRINTING BUTTON, INPUT USER ID) |
| X > 100 | (PRESS COLOR PRINTING BUTTON, INPUT ADMINISTRATOR PASSWORD) |
| ····· | ····· |

70D

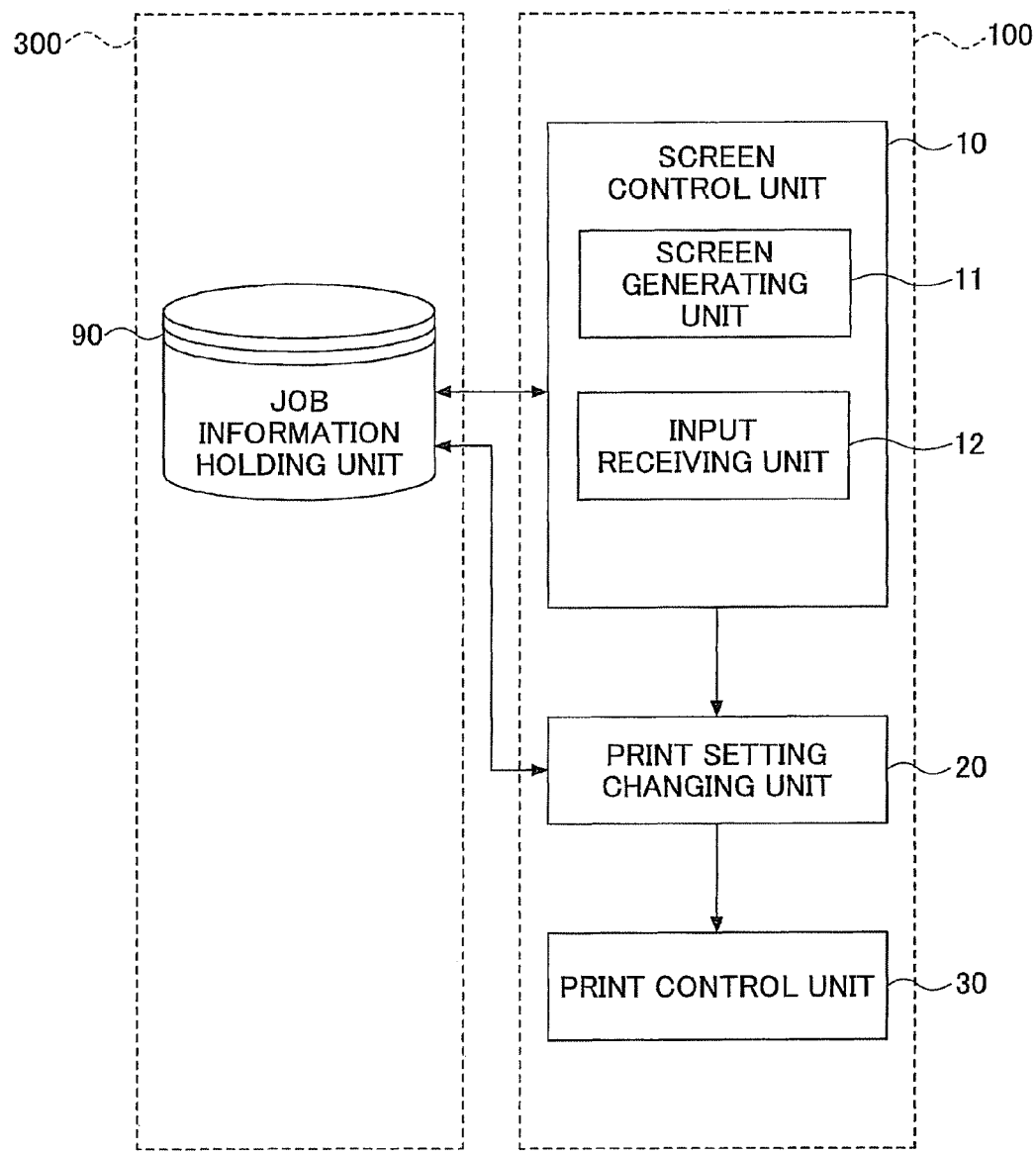

IMAGE PROCESSING APPARATUS, PRINT CONTROL METHOD, RECORDING MEDIUM STORING PRINT CONTROL PROGRAM

BACKGROUND OF THE INVENTION

1. Field of the Invention

The present invention relates to a technology of printing a job stored in an image processing apparatus.

2. Description of the Related Art

For example, patent document 1 discloses a print control technology of changing the print setting when a color printing job is received from a user, and performing monochrome printing. The purpose of this technology is to control the running cost when performing printing.

However, in the conventional print control operation, the print job is compulsorily printed by monochrome printing, even when the print job is intended to be printed by color printing.

In actual business operations, as an example of a job printed by an image processing apparatus, there is proposal material for submitting to a client. The proposal material is intended to be printed by color printing, so that the material is easier to be visually comprehended in terms of business purposes. However, in the conventional technology, this print job is compulsorily printed by monochrome printing. This is inconvenient for the user.

Therefore, it is desirable to provide a printing function with which the running cost is reduced without reducing the convenience for a user who desires color printing. Specifically, it is desirable to realize an environment in which the user is encouraged to use monochrome printing under regular conditions and to use color printing only when necessary.

Patent Document 1: Japanese Laid-Open Patent Application No. 2010-108470

SUMMARY OF THE INVENTION

The present invention provides an image processing apparatus, a print control method, and a recording medium storing a print control program, in which one or more of the above-described disadvantages are eliminated.

A preferred embodiment of the present invention provides an image processing apparatus, a print control method, and a recording medium storing a print control program, with which a function that a user is encouraged to use is easier to operate and easier to use compared to other functions.

According to an aspect of the present invention, there is provided an image processing apparatus includes a display unit; a screen control unit configured to control display of operation screens on the display unit so that there are more operation procedures for color printing compared to monochrome printing in printing operations performed by a user; a setting change unit configured to change a print setting of print data of a selected stored job, among stored jobs stored in a predetermined storage area, to monochrome or color when a print execution instruction is received, based on the print execution instruction received from an operation screen controlled and displayed by the screen control unit; and a print control unit configured to execute monochrome printing or color printing on the print data according to the print setting changed by the setting change unit.

According to an aspect of the present invention, there is provided a print control method performed by an image processing apparatus including a display unit, the print control method including controlling display of operation screens on the display unit so that there are more operation procedures for color printing compared to monochrome printing in printing operations performed by a user; changing a print setting of print data of a selected stored job, among stored jobs stored in a predetermined storage area, to monochrome or color when a print execution instruction is received, based on the print execution instruction received from a displayed operation screen; and executing monochrome printing or color printing on the print data according to the changed print setting.

According to an aspect of the present invention, there is provided a non-transitory recording medium storing a print control program that causes a computer to execute a method including controlling display of operation screens on the display unit so that there are more operation procedures for color printing compared to monochrome printing in printing operations performed by a user; changing a print setting of print data of a selected stored job, among stored jobs stored in a predetermined storage area, to monochrome or color when a print execution instruction is received, based on the print execution instruction received from a displayed operation screen; and executing monochrome printing or color printing on the print data according to the changed print setting.

BRIEF DESCRIPTION OF THE DRAWINGS

Other objects, features and advantages of the present invention will become more apparent from the following detailed description when read in conjunction with the accompanying drawings, in which:

FIG. 4 illustrates an example of data of job information according to the first embodiment of the present invention;

FIG. 8 illustrates an example of data of usage restriction information according to the second embodiment of the present invention;

FIG. 15 illustrates an example of data of definition information according to the third embodiment of the present invention;

FIG. 19 illustrates a functional configuration of print control according to the modification of the present invention.

DETAILED DESCRIPTION OF THE PREFERRED EMBODIMENTS

A description is given, with reference to the accompanying drawings, of embodiments of the present invention.

First Embodiment

System Configuration

Figure 1:
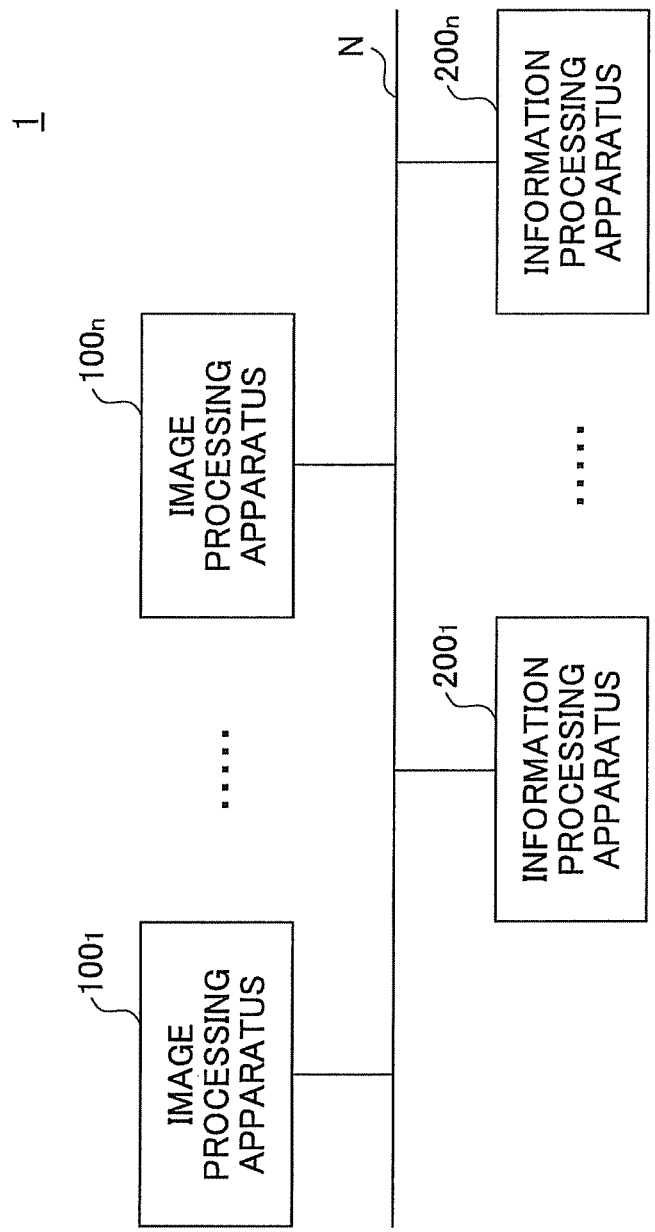
FIG. 1 illustrates a configuration of print control system according to a first embodiment of the present invention.

FIG. 1 illustrates a configuration of print control system 1 according to a first embodiment.

FIG. 1 illustrates a system configuration including one or more image processing apparatuses 100$_1$ through 100$_n$ (hereinafter, also referred to collectively as "image processing apparatus 100") and one or more information processing apparatuses 200$_1$ through 200$_n$ (hereinafter, also referred to collectively as "information processing apparatus 200"), which are connected by a data transmission path N such as a network (for example, "LAN: Local Area Network").

The image processing apparatus 100 is a device having an image processing function including a printing function, such as a MFP (Multifunction Peripheral) and an LP (Laser Printer). The information processing apparatus 200 is a device having an information processing function, such as a PC (Personal Computer).

The print control system 1 according to the present embodiment provides the following printing service to the user. For example, when a print job is transmitted from the information processing apparatus 200 to the image processing apparatus 100, the image processing apparatus 100 stores and accumulates the data of the received print job (hereinafter, "print data") in a predetermined storage area. Subsequently, the image processing apparatus 100 receives, from the user, a selection and an execution instruction for the stored print job (hereinafter, "stored job"). At this time, the image processing apparatus 100 determines whether to execute monochrome printing or to change the setting to color printing, based on the received execution instruction. As a result, when the execution instruction is for monochrome printing, the image processing apparatus 100 acquires, from a predetermined storage area, data corresponding to the stored job that has been selected, and prints the acquired data by monochrome printing based on the execution instruction. Meanwhile, when an instruction is given to change the setting for color printing, the image processing apparatus 100 displays an operation screen for receiving an instruction to execute color printing, and receives an instruction to execute color printing from the user. As a result, the image processing apparatus 100 acquires, from a predetermined storage area, data corresponding to the stored job that has been selected, and prints the acquired data by color printing based on the execution instruction.

As described above, the print control system 1 according to the present embodiment can provide the above printing service (stored printing function).

Hardware Configuration

Figure 2:
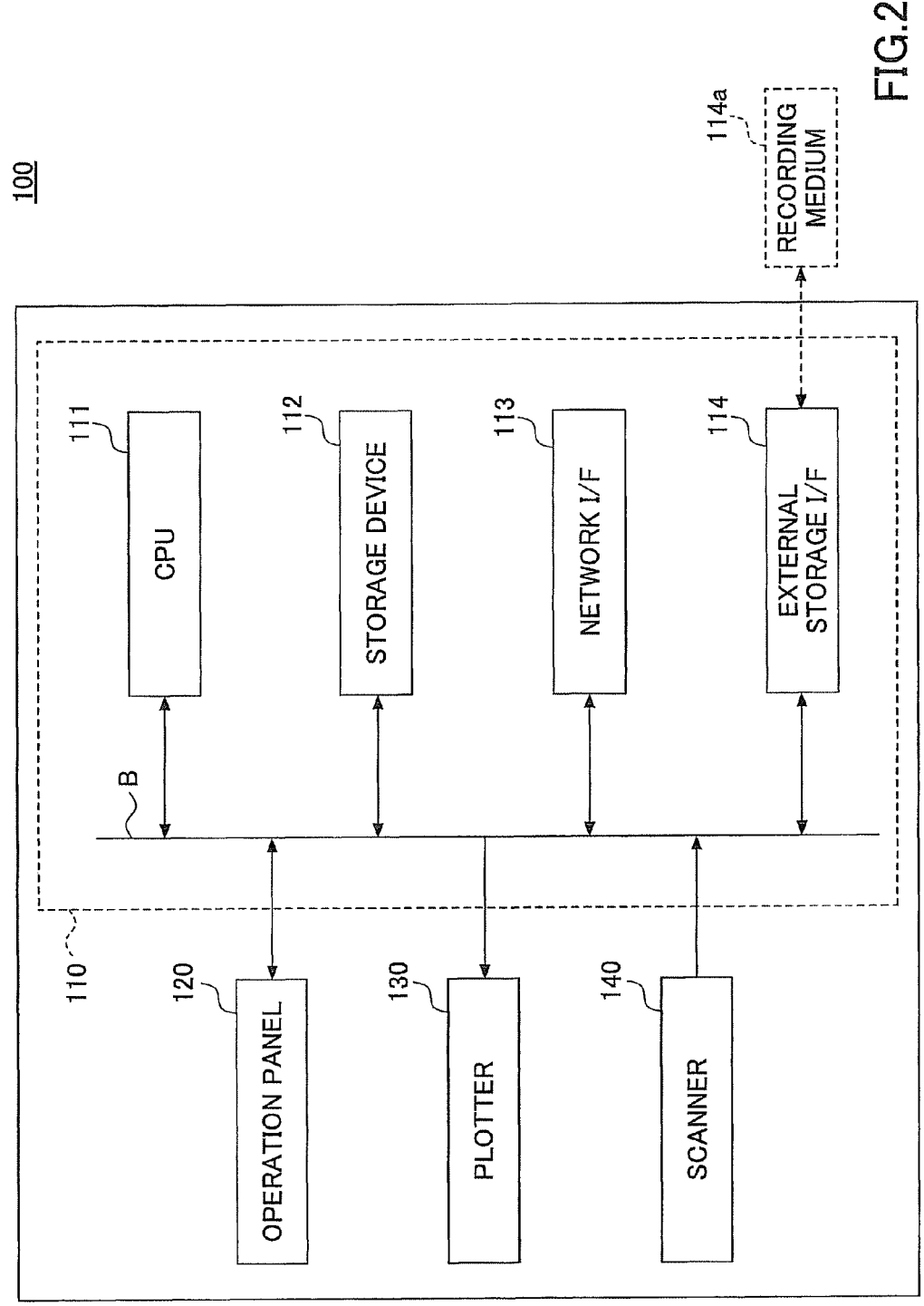
FIG. 2 illustrates a hardware configuration of an image processing apparatus according to the first embodiment of the present invention.

FIG. 2 illustrates a hardware configuration of the image processing apparatus 100 according to the first embodiment. In the example of FIG. 2, it is assumed that the image processing apparatus 100 is an MFP.

As shown in FIG. 2, the image processing apparatus 100 includes a controller 110, an operation panel 120, a plotter 130, and a scanner 140, which are interconnected by a bus B.

The operation panel 120 includes a display unit and an input unit, and provides various information items such as device information to the user, and receives various user operations such as operation settings and operation instructions. The plotter 130 includes an image forming unit, and forms output images on sheets. Examples of methods of forming output images are an electrophotographic process and an inkjet method. The scanner 140 optically scans an original document and generates a scanned image.

The controller 110 includes a CPU (Central Processing Unit) 111, a storage device 112, a network I/F 113, and an external storage I/F 114.

The CPU 111 controls the entire device by executing programs. The storage device 112 stores and holds the programs and various kinds of data (for example, "image data"). The storage device 112 may be a RAM (Random Access Memory), a ROM (Read Only Memory) which is a non-volatile memory, and a HDD (Hard Disk Drive) having a high-volume storage area. The RAM functions as a work area (a storage area where programs and data are temporarily loaded) of the CPU 111. The ROM and HDD are used for storing programs and various kinds of data. Accordingly, in the image processing apparatus 100, the CPU 111 loads, in the RAM, the programs stored in the ROM, and executes the programs.

The network I/F 113 is an interface for connecting the image processing apparatus 100 to a predetermined data transmission path N such as a network. Accordingly, the image processing apparatus 100 can perform data communications with the information processing apparatus 200 via the network I/F 113.

The external storage I/F 114 is an interface for connecting a recording medium 114a that is an external storage device. Examples of the recording medium 114a are a SD memory card and a USB memory (Universal Serial Bus memory). Accordingly, the image processing apparatus 100 can read/write data in the recording medium 114a via the external storage I/F 114.

As described above, the image processing apparatus 100 according to the present embodiment can provide an image processing service (image processing function) including a printing function by the above hardware configuration.

Print Control Function

A description is given of a print control function according to the present embodiment.

The image processing apparatus 100 according to the present embodiment controls the display of the operation screens on the operation panel 120 of the image processing apparatus 100, so that in the printing operations performed by the user, there are more operation procedures for color printing compared to monochrome printing. The image processing apparatus 100 changes the print setting to monochrome or color based on the print execution instruction received from the operation screen. The image processing apparatus 100 executes monochrome printing or color printing according to the changed print setting. The image processing apparatus 100 according to the present embodiment has the above print control function.

In the conventional print control operation, the print job is compulsorily printed by monochrome printing for the purpose of reducing the running cost, even when the print job is intended to be printed by color printing. This is inconvenient for the user.

The image processing apparatus 100 according to the present embodiment controls the display of the operation screens, so that in the printing operations performed by the user, there are more operation procedures for color printing compared to monochrome printing. The image processing apparatus 100 changes the print setting to monochrome or color based on the print execution instruction received from the operation screen. The image processing apparatus 100 executes monochrome printing or color printing according to the changed print setting.

Accordingly, with the image processing apparatus 100 according to the present embodiment, a function that a user is encouraged to use (monochrome printing) is easier to operate and easier to use compared to other functions (color printing). As a result, when regular printing is performed, the user is encouraged to use monochrome printing that can be performed with fewer operation procedures and that can be used easily, and to use color printing only when necessary. Thus, with the image processing apparatus 100 according to the present embodiment, the running cost of printing can be reduced, without reducing the convenience for users who desire color printing.

In the following, the configuration and operation of the print control function according to the present embodiment is described.

Figure 3:
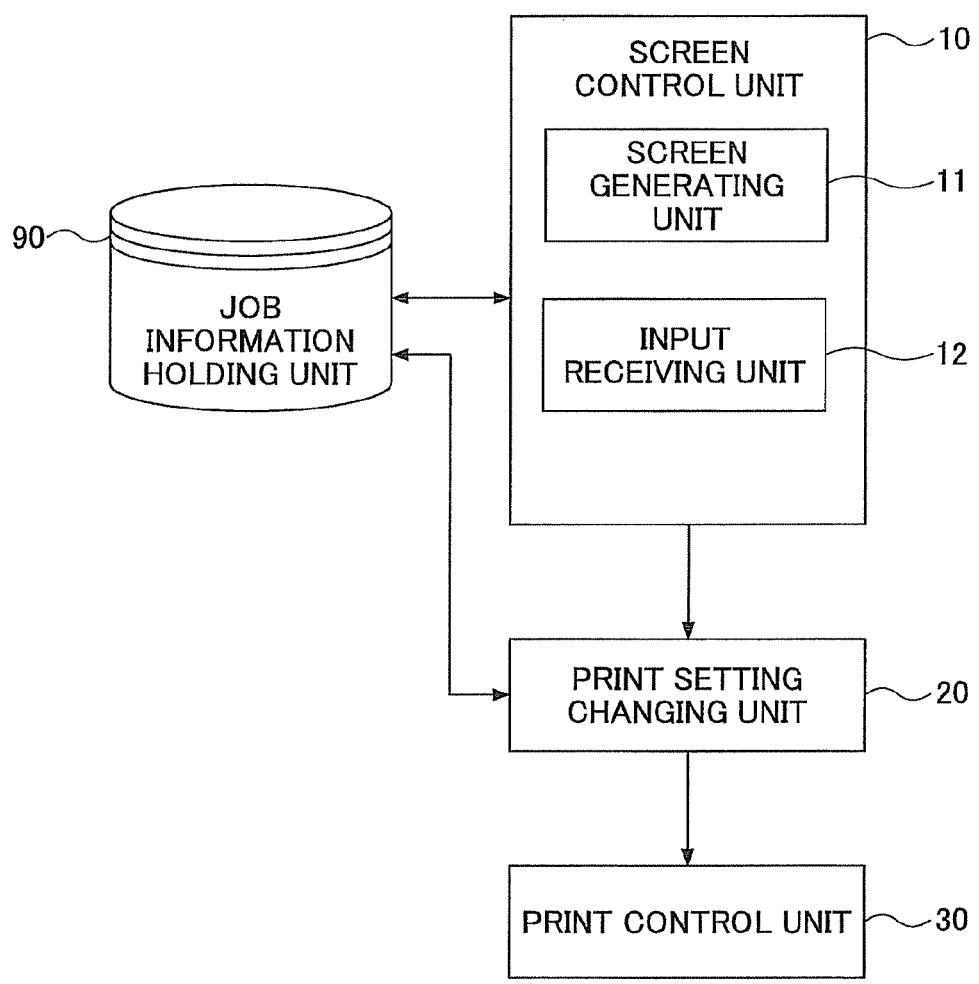
FIG. 3 illustrates a functional configuration of print control according to the first embodiment of the present invention.

FIG. 3 illustrates a functional configuration of print control according to the first embodiment.

As shown in FIG. 3, the print control function according to the present embodiment includes a screen control unit 10, a print setting changing unit 20, a print control unit 30, and a job information holding unit 90. These functional units are operated in the image processing apparatus 100.

The job information holding unit 90 is a functional unit for holding information relevant to a print job (hereinafter, "job information"). The job information holding unit 90 corresponds to a predetermined storage area in the storage device 112 (for example, "HDD") provided in the image processing apparatus 100.

Here, a description is given of job information.

FIG. 4 illustrates an example of data of job information 90D according to the first embodiment.

As shown in FIG. 4, the job information 90D includes information items such as job identification, user identification, job name, number of pages, color/monochrome, double-sided/single-sided, and number of copies, which are associated in units of print jobs and held in the job information holding unit 90.

The job identification item is for holding information for identifying print jobs (hereinafter, "job identification information"), and the item values are ID values issued for each print job. The user identification item is for holding information for identifying users who are owners of print jobs (hereinafter, "user identification information"), and the item values are ID values issued each user or character strings of user names. The job name item is for holding information indicating names of print jobs (hereinafter, "job name information"), and the item values are character strings indicating print data names (file names). The number of pages item is for holding information indicating the numbers of pages of print jobs (hereinafter, "page number information), and the item values are values indicating the number of pages.

Furthermore, the color/monochrome item is for holding information indicating color or monochrome set as the printing condition (hereinafter, "color/monochrome setting information"), and the item values are setting values such as "color" or "monochrome". The double-sided/single-sided item is for holding information indicating whether double-sided printing or single-sided printing is set as the print condition (hereinafter, "double-sided/single-sided setting information"), and the item values are setting values such as "double-sided" and "single-sided". The number of copies item is for holding information indicating the number of copies set as the print condition (hereinafter, "copy number setting information"), and the item values are setting values indicating the number of copies. In the following description, the "setting of print conditions" is simply referred to as "print setting", as a matter of convenience.

The item values of the above information items are acquired from bibliographic information and print condition information included in print data received from the image processing apparatus 100. Specifically, the item values can be acquired by analyzing the PJL data (Printer Job Language data) that corresponds to the header of PDL data (Page Description Language data) that is the print data. The item values of the items of job identification, user identification, job name, and number of pages can be acquired from the bibliographic information, and item values of the items of color/monochrome, double-sided/single-sided, and number of copies can be acquired from the print condition information.

Subsequently, the acquired item values are held in association with the received print data. Specifically, the item values are associated based on job identification information issued when storing and accumulating the received print data in a predetermined storage area.

Referring back to FIG. 3, the screen control unit 10 is a functional unit for controlling the operation screen when printing. The screen control unit 10 mainly has a screen generating unit 11 for generating an operation screen and an input receiving unit 12 for receiving input from the operation screen. The screen generating unit 11 uses display elements that have been prepared in advance to generate an operation screen based on predetermined layout information. Examples of the display elements are graphic data for forming a GUI (Graphical User Interface) on the screen and text data for expressing display contents. For example, the layout information is allocation data of display elements according to screen coordinates.

The screen generating unit 11 generates the following operation screen according to a generation instruction from the screen control unit 10. The operation screens used when printing include an operation screen for selecting a job and an operation screen for changing the print setting (hereinafter, "print setting screen"). For example, in the job list screen, the job information 90D that is a list of stored jobs is displayed, and the job list screen includes a job selection button for selecting a job to be printed from among the displayed list of stored jobs, a print setting button for instructing to transit to an operation screen for changing the print setting, and a print button for instructing to execute monochrome printing. Furthermore, the print setting screen includes a color printing button for instructing to execute color printing, a copy number change printing button for instructing to execute print according to the specified number of copies, and a save printing button for instructing to execute save printing according to specified format conversions and specified save destinations (transfer destinations). The screen control unit 10 displays, on the operation panel 120 of the image processing apparatus 100, the above operation screen generated by the screen generating unit 11.

The input receiving unit 12 receives input from the operation screen based on an operation event performed by operating the screen. The operation event is an input signal issued according to operations such as pressing buttons and inputting data with keys. The received input may be an instruction to execute a process defined from an input signal, an instruction to select a processing target, an instruction to transit to another operation screen, and data input by keys.

The input receiving unit 12 passes the following screen operation input to the screen control unit 10. The input received via the above operation screen includes instructions for executing various printing operations such as monochrome, color, changing the number of copies, and saving, selecting a stored job, and instructing to transit to an operation screen for changing the print setting. The screen control unit 10 controls the display of the operation screens based on screen operation input received by the input receiving unit 12.

First, when a request to display a job list screen is received from a user, the screen control unit 10 accesses the job information holding unit 90, acquires the job information 90D, passes the acquired job information 90D to the screen generating unit 11, and instructs to generate a screen. Accordingly, on the operation panel 120, a job list screen from which jobs can be selected is displayed. At this time, when the print button is pressed after a job selection button is pressed in the operation screen, the screen control unit 10 receives, at the input receiving unit 12, a selection of a stored job and an instruction to execute monochrome printing. As a result, the screen control unit 10 passes the job identification information of the selected stored job to the print setting changing unit 20 described below, and instructs to execute monochrome printing (monochrome compulsory printing). That is to say, in the present embodiment, monochrome printing is executed by one action (pressing a button once) after selecting a job.

Meanwhile, when the print setting button is pressed after pressing the job selection button in the operation screen, the screen control unit 10 receives, at the input receiving unit 12, a selection of a stored job and an instruction to transit to the operation screen for changing the print setting. As a result, the screen control unit 10 instructs the screen generating unit 11 to generate a screen. Accordingly, the print setting screen by which settings can be changed is displayed on the operation panel 120. At this time, when the color printing button is pressed in the operation screen, the screen control unit 10 receives, at the input receiving unit 12, an instruction to execute color printing. As a result, the screen control unit 10 passes the job identification information of the selected stored job to the print setting changing unit 20 described below, and instructs to execute color printing. That is to say, in the present embodiment, color printing is executed by two actions (pressing buttons twice) after selecting a job.

As described above, in the image processing apparatus 100, the color printing button is not located in the job list screen for performing color printing. In the image processing apparatus 100, in the printing operations, the display of the operation screens is controlled so that there are more operation procedures for color printing compared to monochrome printing. As a result, the user tends to use monochrome printing unless color printing is necessary, because color printing requires more operation procedures compared to monochrome printing.

The print setting changing unit 20 is a functional unit for changing the print setting. Furthermore, the print control unit 30 is a functional unit for controlling execution of printing.

The print setting changing unit 20 changes the print setting of the selected stored job based on an instruction to execute various printing operations received at the screen control unit 10. The print setting changing unit 20 accesses the job information holding unit 90, and acquires print data of the selected stored job, based on the job identification information from the screen control unit 10. As described above, the print data includes print condition information. The print setting changing unit 20 changes the values of the print condition information to values according to the execution instruction, passes the changed print data to the print control unit 30, and instructs to execute printing.

For example, when the screen control unit 10 receives an instruction to execute monochrome printing for print data having "color" set in the print condition information, the print setting changing unit 20 changes the setting value in the print condition information to a value according to the execution instruction (from a "color" setting to a "monochrome" setting). Furthermore, for example, when the screen control unit 10 receives an instruction to execute printing of 10 copies of print data having "one copy" set in the print condition information (copy number changing printing), the print setting changing unit 20 changes the setting value of the print condition information to a value according to the execution instruction (from a setting of "one copy" to a setting of "10 copies"). The print setting changing unit 20 passes, to the print control unit 30, the print data whose print condition information has been changed as described above.

As a result, the print control unit 30 analyzes the print data from the print setting changing unit 20, generates a raster image (bitmap image) based on the print condition information, and sets the value of the print condition information in the plotter 130. That is to say, the print control unit 30 is implemented by a PDL parser. Accordingly, at the plotter 130, the generated raster image is printed according to the set print conditions.

As described above, in the image processing apparatus 100, the print setting is changed to monochrome or color based on the print execution instruction received at the operation screen, and monochrome printing or color printing is executed according to the changed print setting.

As described above, the print control function according to the present embodiment is realized as the above functional units operate in cooperation with each other. The functional units realized as programs (software for realizing the print control function) installed in the image processing apparatus 100 are loaded into the storage device 112 by the CPU 111 (for example, loaded into the RAM from the HDD or the ROM), and the following process is executed.

A description is given of detailed operations of the print control function (cooperative operations of functional units) according to the present embodiment, with reference to a flowchart indicating processing procedures.

Print Control Process

Figure 5:
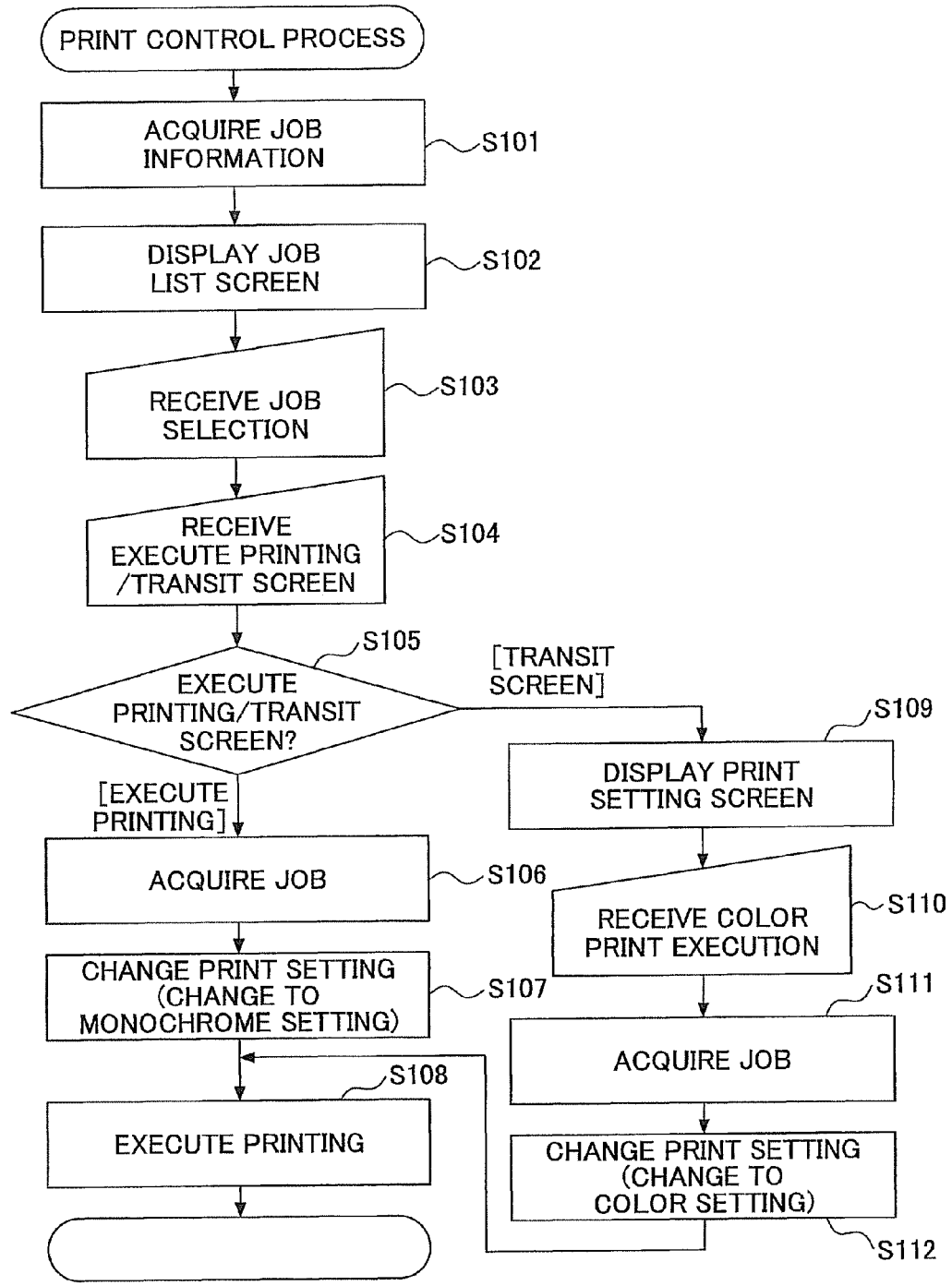
FIG. 5 is a flowchart of processing procedures of print control according to the first embodiment of the present invention.

FIG. 5 is a flowchart of processing procedures of print control according to the first embodiment. The process indicated in FIG. 5 is executed when the image processing apparatus 100 receives a request to display a job list screen from the user.

As shown in FIG. 5, the screen control unit 10 accesses the job information holding unit 90, and acquires the job information 90D of the stored job (step S101).

The screen control unit 10 (screen generating unit) generates a job list screen from which a job can be selected based on the acquired job information 90D, and displays the job list screen on the operation panel 120 (step S102).

When the user identification information is received when the user logs in, the screen control unit 10 may acquire the job information 90D of the stored job based on the user identification information, and instruct the screen generating unit 11 to generate a job list screen for each user.

The screen control unit 10 (input receiving unit) receives, from the job list screen, a selection of a stored job for which printing is executed, and an instruction to execute printing or to transit to the print setting screen (step S103). At this time, the input receiving unit 12 receives a selection of a stored job based on an operation event performed by pressing the job selection button, and receives an instruction to execute printing or to transit to the print setting screen based on an operation event performed by pressing either one of the print button or the print setting button.

The screen control unit 10 determines whether an instruction to execute printing or to transit to the print setting screen has been received (step S105).

When it is determined that an instruction to execute printing has been received (EXECUTE PRINTING in step S105), the screen control unit 10 instructs the print setting changing unit 20 to execute monochrome printing of the selected stored job. At this time, the screen control unit 10 passes the job identification information of the selected stored job to the print setting changing unit 20.

When the job identification information is received, the print setting changing unit 20 accesses the job information holding unit 90, and acquires the selected stored job (step S106). At this time, the print setting changing unit 20 acquires the print data of the selected stored job.

The print setting changing unit 20 changes the print condition of the acquired print data to a monochrome setting (step S107). The print setting changing unit 20 passes the changed print data to the print control unit 30, and instructs to execute monochrome printing.

When the changed print data is received, the print control unit 30 analyzes the print data, generates a raster image based on the print condition (monochrome setting), sets the print condition in the plotter 130, and executes printing (monochrome compulsory printing) (step S108).

Meanwhile, when it is determined that an instruction to transit to the print setting screen is received (TRANSIT SCREEN in step S105), the screen control unit 10 generates the print setting screen, and displays the print setting screen on the operation panel 120 (step S109).

The screen control unit 10 (input receiving unit) receives an instruction to execute color printing from the print setting screen (step S110). At this time, the input receiving unit 12 receives an instruction to execute color printing based on an operation event performed by pressing the color printing button. Furthermore, the screen control unit 10 passes job identification information of the selected stored job to the print setting changing unit 20, and instructs to execute color printing.

When the job identification information is received, the print setting changing unit 20 accesses the job information holding unit 90, and acquires the selected stored job based on the job identification information (step S111). At this time, the print setting changing unit 20 acquires the print data of the selected stored job.

The print setting changing unit 20 changes the print condition of the acquired print data to a color setting (step S112). The print setting changing unit 20 passes the changed print data to the print control unit 30, and instructs to execute color printing.

When the print data is received, the print control unit 30 analyzes the print data, generates a raster image based on the print condition (color setting), sets the print condition in the plotter 130, and executes printing (step S108).

When a button other than the color printing button is pressed in the print setting screen (for example, the copy number change printing button or the save printing button), the screen control unit 10 (input receiving unit) instructs the print setting changing unit 20 to change the received print setting and to execute monochrome printing (monochrome compulsory printing). Accordingly, the image processing apparatus 100 performs monochrome compulsory printing according to the changed number of copies and the saving destination.

Operation Example of Print Control

Figure 6:
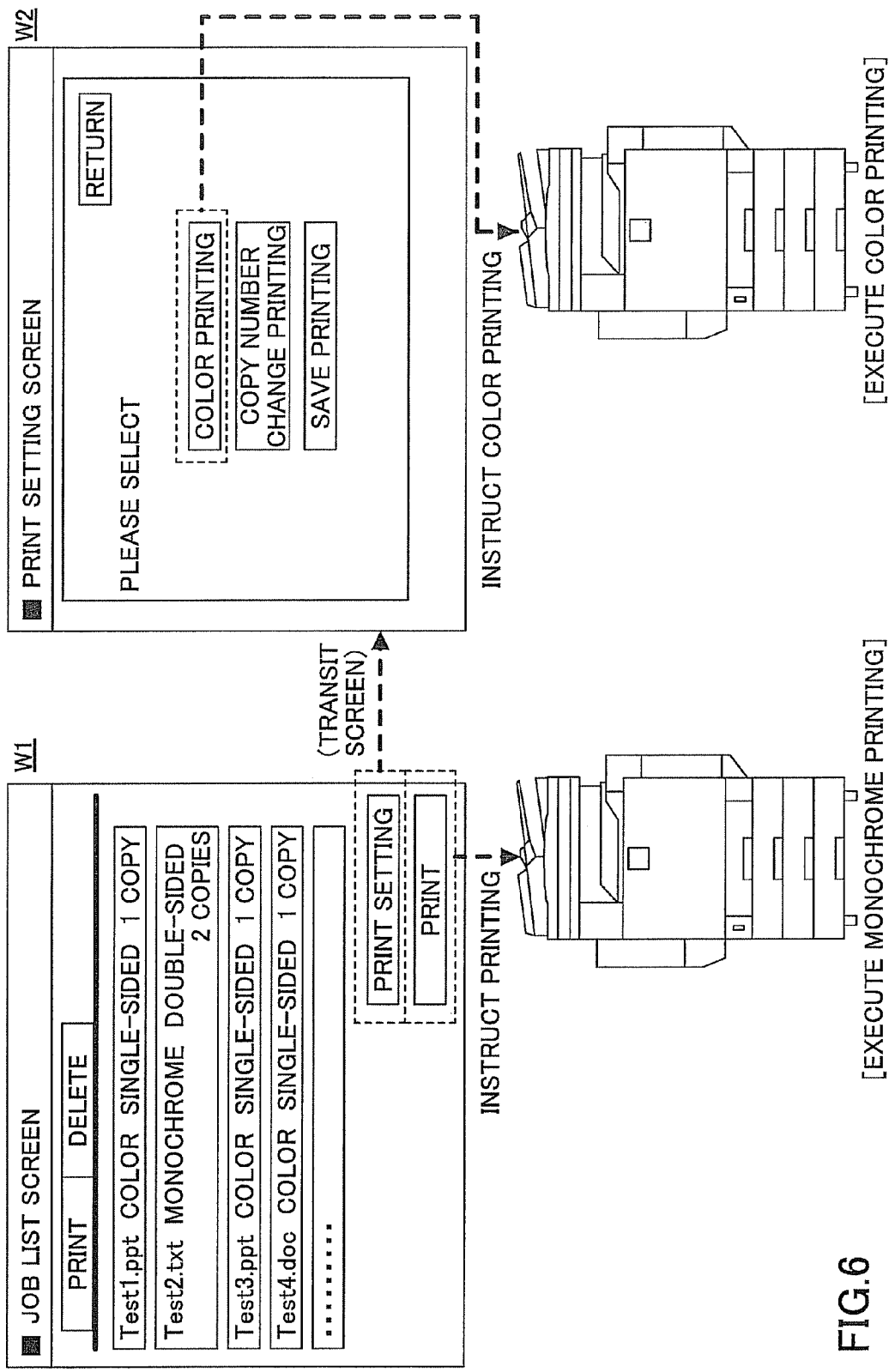
FIG. 6 illustrates an operation example of print control according to the first embodiment of the present invention.

FIG. 6 illustrates an operation example of print control according to the first embodiment. FIG. 6 illustrates an operation example of displaying screens and printing by the image processing apparatus 100 when the process of FIG. 5 is executed.

In the image processing apparatus 100, the job list screen W1 is displayed on the operation panel 120. At this time, when the printing button is pressed in the job list screen W1, in the image processing apparatus 100, the print condition of the print data of the selected stored job is changed to a monochrome setting based on the received print execution instruction, and monochrome printing (monochrome compulsory printing) is executed according to the changed print setting.

Meanwhile, in the image processing apparatus 100, when the print setting button is pressed in the job list screen W1, a print setting screen W2 is displayed on the operation panel 120 based on the received screen transition instruction. Subsequently, in the image processing apparatus 100, when the color printing button is pressed in the print setting screen W2, the print condition of the print data of the selected stored job is changed to a color setting based on the received print execution instruction, and color printing is executed according to the changed print setting.

As described above, in the image processing apparatus 100, the display of operation screens is controlled so that there are more operation procedures for color printing compared to monochrome printing in the printing operations, the print setting is changed to monochrome or color based on a print execution instruction received from the operation screen, and monochrome printing or color printing is executed according to the changed print setting.

Overview

As described above, in the image processing apparatus 100 according to the present embodiment, the screen control unit 10 controls the display of the operation screens on the operation panel 120 of the image processing apparatus 100, so that there are more operation procedures for color printing compared to monochrome printing in the printing operations. In the image processing apparatus 100, the print setting changing unit 20 changes the print setting to monochrome or color, based on the print execution instruction received from the operation screen. In the image processing apparatus 100, the print control unit 30 executes monochrome printing or color printing according to the changed print setting.

Thus, in the image processing apparatus 100 according to the present embodiment, a function that a user is encouraged to use (monochrome printing) is easier to operate and easier to use compared to other functions (color printing). As a result, when regular printing is performed, the user is encouraged to use monochrome printing that can be performed with fewer operation procedures and that can be used easily, and to use color printing only when necessary. That is to say, by making the operation for color printing more complex compared to monochrome printing, usually, the user is psychologically encouraged to use monochrome printing. Thus, with the image processing apparatus 100 according to the present embodiment, the running cost of printing can be reduced, and color printing can also be performed (the convenience for the user is not degraded).

Second Embodiment

The second embodiment proposes a technology of controlling the display of operation screens when printing, and performing print control according to a print setting changed by a user who is allowed to use the printing function according to a usage restriction (a user to which usage restriction is not applied). In the following, only the points that are different from the first embodiment are described, and similar points are not further described.

Print Control Function

Figure 7:
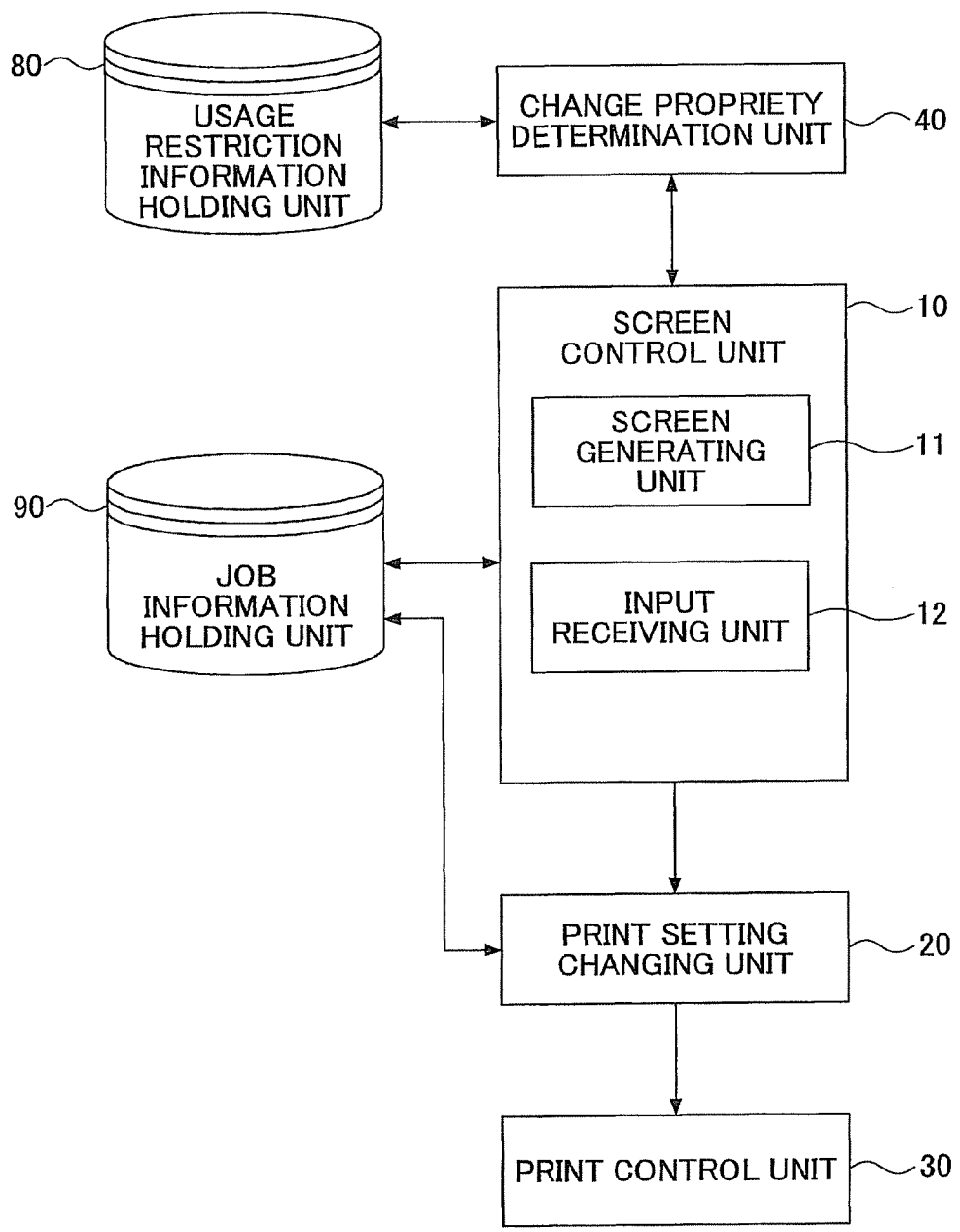
FIG. 7 illustrates a functional configuration of print control according to a second embodiment of the present invention.

FIG. 7 illustrates a functional configuration of print control according to the second embodiment.

As shown in FIG. 7, the difference between the present embodiment and the first embodiment is that the present embodiment includes a change propriety determination unit 40 and a usage restriction information holding unit 80. These functional units also operate in the image processing apparatus 100.

The usage restriction information holding unit 80 is a functional unit for holding information for restricting usage of a printing function (hereinafter, "usage restriction information"). The usage restriction information holding unit 80 corresponds to a predetermined storage area in the storage device 112 provided in the image processing apparatus 100.

A description is given of the usage restriction information.

FIG. 8 illustrates an example of data of usage restriction information 80D according to the second embodiment.

As shown in FIG. 8, in the usage restriction information 80D, information items such as user identification, usage upper limit, and usage status are associated in units of users and held in the usage restriction information holding unit 80.

The user identification item is an item in which user identification information is set, and the item values are ID values issued for each user and characters strings of user names. The usage upper limit item is an item in which information (hereinafter, "usage upper limit information") indicating the usage upper limit (threshold of usage restriction) is set, and the item values are the upper limit of the number of times of usage. The usage status item is an item in which information indicating the usage status (control value of usage restriction) of a printing function (hereinafter, "usage status information") is recorded, and the setting values are the present number of times of usage.

In the present embodiment, the number of times of usage is given as an example of the usage restriction information 80D; however, the present invention is not so limited. For example, the number of used sheets may be used as the usage restriction information 80D.

Among the above information items, the item values of the user identification and the usage upper limit may be set in advance with the use of a predetermined tool by the administrator, for example. Furthermore, as to the item value of the usage status item, for example, a calculation value based on a counter value of a printing function may be recorded based on user identification information and updated when the function is used.

Furthermore, in the present embodiment, the number of times of usage in the items of usage upper limit and usage status is assumed to be the number of items of usage of color printing.

Referring back to FIG. 7, the change propriety determination unit 40 is for determining whether the user desiring to print a stored job can change the print setting. The change propriety determination unit 40 determines whether the user can change the print condition of print data of the selected stored job to a color setting. In the present embodiment, the above determination of whether the change can be made (change propriety determination) is performed based on the user's usage restriction information 80D. Details are described below.

The change propriety determination unit 40 accesses the usage restriction information holding unit 80, and acquires the usage restriction information 80D of the user for which the change propriety determination is to be made, based on user identification information. The change propriety determination unit 40 compares the value of the usage status information (number of times of usage) in the acquired usage restriction information 80D with the value of the usage upper limit information (usage upper limit number), and determines whether usage is to be restricted based on the comparison result. For example, when the comparison result indicates that the number of times of usage in the usage status information is greater than or equal to the usage upper limit value in the usage upper limit information, it is determined that usage is to be restricted for the user desiring to print the stored job. Based on the result of the above restriction requirement determination, the change propriety determination unit 40 performs the above change propriety determination. When it is determined that usage is to be restricted, the change propriety determination unit 40 determines that the user cannot change the print condition to a color setting. When it is determined that usage does not need to be restricted, the change propriety determination unit 40 determines that the user can change the print condition to a color setting.

In the present embodiment, the change propriety determination is performed based on the condition of the usage upper limit value; however, the present invention is not so limited. For example, the determination may be performed based on conditions such as authority information and the number of copies to be printed set for each user. When the determination is made based on the condition of the number of copies to be printed, the determination is made as follows. In the case of high volume printing, the printing operation is likely to be for business purposes (requiring color printing), and therefore it is determined that the user can change the printing condition to a color setting. Meanwhile, in a case where one copy is to be printed, the printing operation is likely to be for personal purposes, and therefore it is determined that the user cannot change the printing condition to a color setting.

In the present embodiment, two operation timings of performing the change propriety determination in print control are proposed. In the first operation timing, the change propriety determination unit 40 performs the change propriety determination according to an operation instruction from the screen control unit 10 when the print setting button is pressed in the job list screen W1. The determination result is returned from the change propriety determination unit 40 to the screen control unit 10. Accordingly, the screen control unit 10 controls whether to activate the function of the color printing button in the print setting screen W2 displayed after transition, based on the determination result. In the present embodiment, the operation of controlling the button function is implemented as the screen generating unit 11 controls the display format of the GUI buttons on the operation screen. In this example, the display format means, for example, to display a GUI button at a full-brightness or at a half-brightness (or to not display a GUI button).

In the second operation timing, the change propriety determination unit 40 performs the change propriety determination according to an operation instruction from the screen control unit 10 when the color printing button is pressed in the print setting screen W2. Accordingly, the screen control unit 10 controls whether to execute color printing after changing the setting, or to display an operation screen (hereinafter, "execution confirmation screen") prompting the user to make a final confirmation of print execution, based on the determination result.

When it is determined that the user can change the setting to color printing, the screen control unit 10 instructs the print setting changing unit 20 to execute color printing according to the print setting change. Meanwhile, when it is determined that the user cannot change the setting to color printing, the screen control unit 10 instructs the screen generating unit 11 to generate an execution confirmation screen. For example, the execution confirmation screen displays a message indicating that color printing cannot be performed, and includes a continue button for instructing to continue monochrome printing (continuation execution instruction). The screen control unit 10 displays the execution confirmation screen generated by the screen generating unit 11 on the operation panel 120. When a continuation execution instruction is received by the input receiving unit 12, the screen control unit 10 instructs the print setting changing unit 20 to execute monochrome printing according to a print setting change.

As described above, the image processing apparatus 100 according to the present embodiment controls the display of the operation screens, so that in the printing operations, there are more operation procedures for color printing compared to monochrome printing. Furthermore, based on a print execution instruction received from a user determined as not requiring usage restriction (a user to which usage restriction is not applied) via an operation screen, the print setting is changed to color, and color printing is executed according to the changed print setting.

A description is given of detailed operations of the print control function (cooperative operations of functional units) according to the present embodiment, with reference to a flowchart indicating processing procedures. In the following, with regard to steps similar to those of the first embodiment, the correspondence relationship is clarified, and only the steps different from those of the first embodiment are described in detail.

Print Control Process: Part 1

Figure 9A:
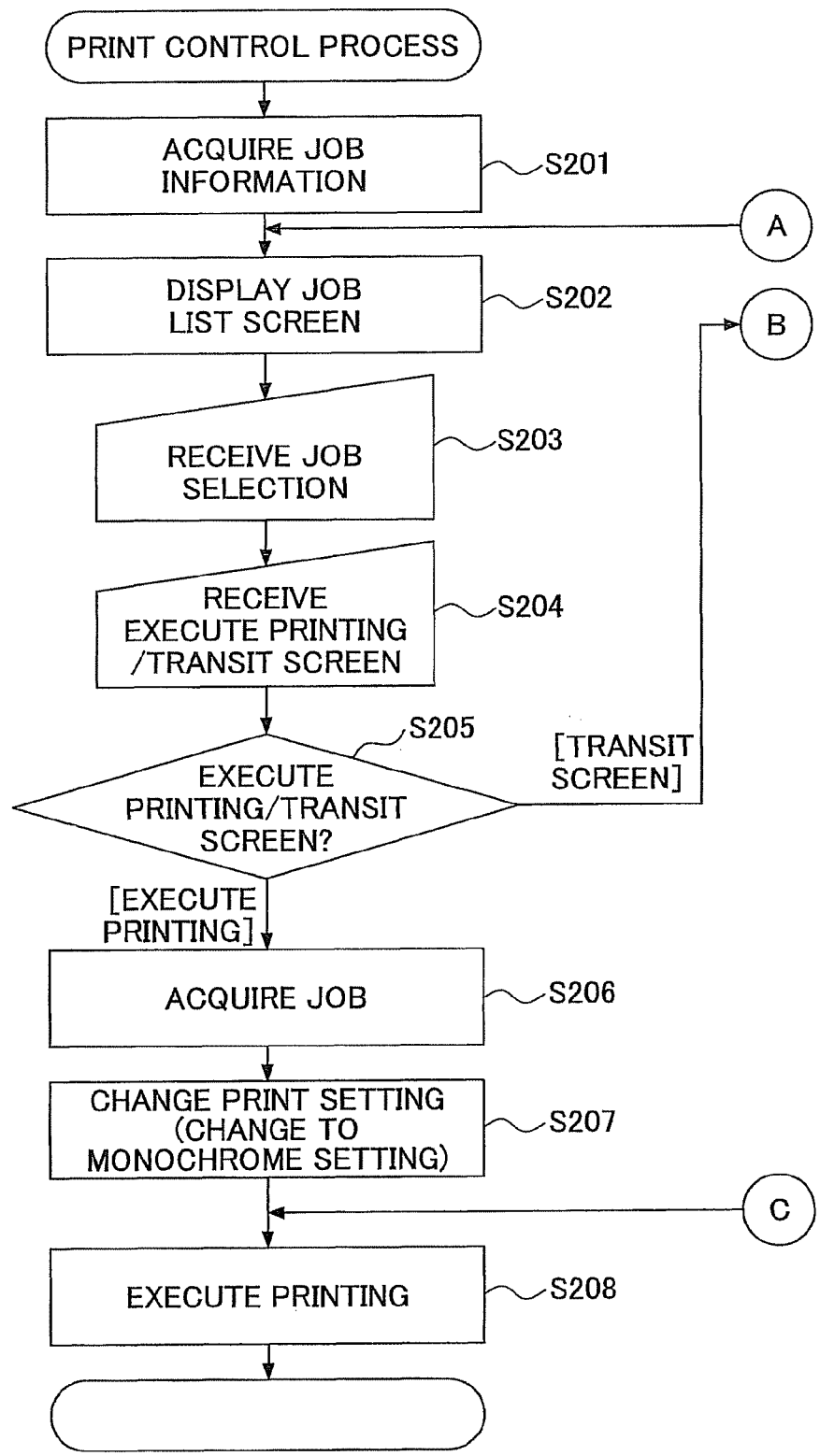
FIGS. 9A and 9B form a flowchart of processing procedures (part 1) of print control according to the second embodiment of the present invention.
Figure 9B:
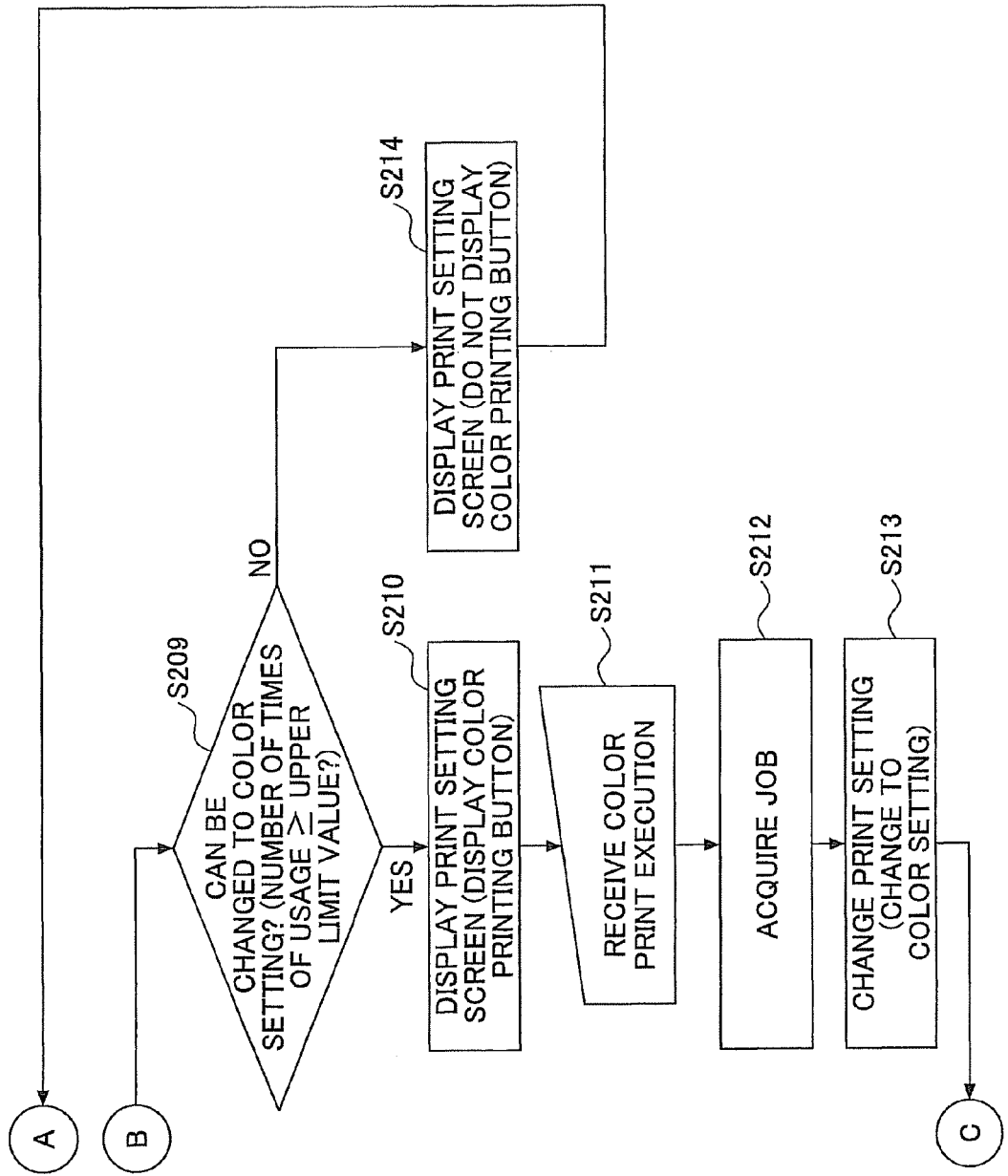

FIGS. 9A and 9B form a flowchart of processing procedures (part 1) of print control according to the second embodiment. The process indicated in FIGS. 9A and 9B is executed when in the image processing apparatus 100, the change propriety determination in print control is executed at the first operation timing described above. Furthermore, steps S201 through S208 in FIGS. 9A and 9B correspond to steps S101 through S108 in FIG. 5. Therefore, only steps S209 through S214 are described.

As shown in FIGS. 9A and 9B, when it is determined that an instruction to transit to the print setting screen W2 is received (TRANSIT SCREEN in step S205), the screen control unit 10 (input receiving unit) instructs the change propriety determination unit 40 to perform change propriety determination as to whether a user can change the print setting. At this time, the screen control unit 10 passes, to the change propriety determination unit 40, the user identification input when the user logged in.

When the user identification is received, the change propriety determination unit 40 determines whether the user can change the print condition of the print data of the selected stored job to a color setting (step S209). At this time, the change propriety determination unit 40 accesses the usage restriction information holding unit 80, and determines whether the number of times of usage in the usage status information in the acquired usage restriction information 80D is greater than or equal to the upper limit of the number of times of usage in the usage upper limit information, based on the user identification information. As a result, when the number of times of usage is greater than or equal to the usage upper limit value, the change propriety determination unit 40 determines that usage restriction needs to be applied to the user and that the user cannot change the print condition to a color setting. Meanwhile, when the number of times of usage is less than the usage upper limit value, the change propriety determination unit 40 determines that usage restriction does not need to be applied to the user, and that the user can change the print condition to a color setting. The change propriety determination unit 40 passes the determination result of change propriety to the screen control unit 10.

When the change propriety determination unit 40 determines that the user can change the print condition to a color setting (YES in step S209), the screen control unit 10 (screen generating unit) generates the print setting screen W2 in which the color printing button functions are displayed, and displays the print setting screen W2 on the operation panel 120 (step S210).

The screen control unit 10 (input receiving unit) receives an instruction to execute color printing from the print setting screen W2 (step S211). At this time, the input receiving unit 12 receives an instruction to execute color printing based on an operation event performed by pressing the color button. The screen control unit 10 passes the job identification information of the selected stored job to the print setting changing unit 20, and instructs to execute color printing.

When the job identification information is received, the print setting changing unit 20 accesses the job information holding unit 90, and acquires the selected stored job based on the job identification information (step S212). At this time, the print setting changing unit 20 acquires the print data of the selected stored job.

The print setting changing unit 20 changes the print condition of the acquired print data to a color setting (step S213). The print setting changing unit 20 passes the changed print data to the print control unit 30, and instructs to execute color printing.

When the print data is received, the print control unit 30 analyzes the print data, generates a raster image based on the print condition (color setting), sets the print condition in the plotter 130, and executes printing (step S208).

Meanwhile, when the change propriety determination unit 40 determines that the user cannot change the print condition to a color setting (NO in step S209), the screen control unit 10 (screen generating unit) generates the print setting screen W2 in which the color printing button does not function (button is not displayed or is displayed at a half-brightness), and displays the print setting screen W2 on the operation panel 120 (step S214).

When an instruction to transit to one operation screen prior to the print setting screen W2 is received, the screen control unit 10 (input receiving unit) returns to step S202, and displays the job list screen W1.

Operation Example of Print Control: Part 1

Figure 10:
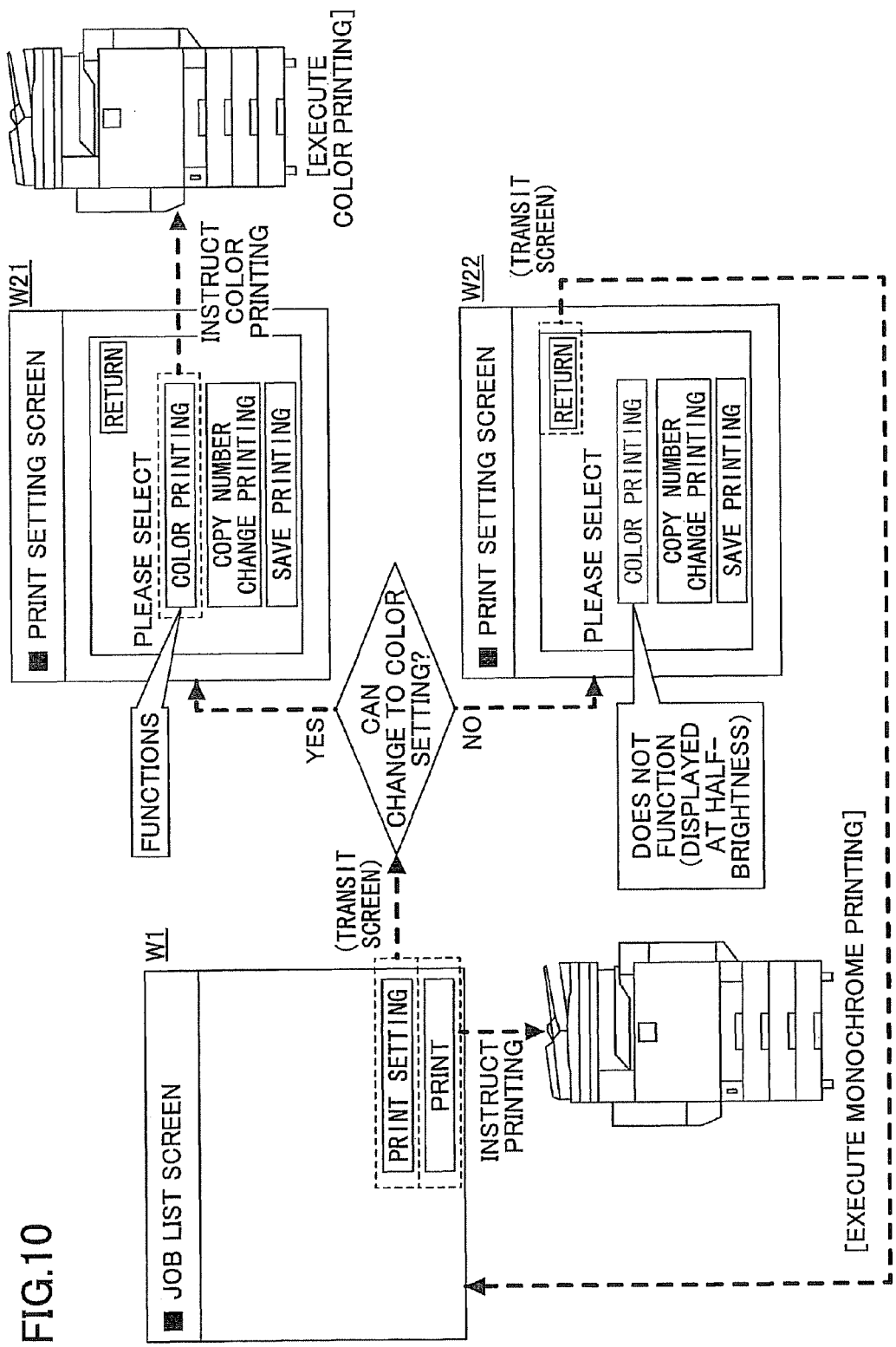
FIG. 10 illustrates an operation example (part 1) of print control according to the second embodiment of the present invention.

FIG. 10 illustrates an operation example (part 1) of print control according to the second embodiment. FIG. 10 illustrates an operation example of displaying screens and printing by the image processing apparatus 100 when the process of FIGS. 9A and 9B is executed.

In the image processing apparatus 100, the job list screen W1 is displayed on the operation panel 120. At this time, when the printing button is pressed in the job list screen W1, in the image processing apparatus 100, the print condition of the print data of the selected stored job is changed to a monochrome setting based on the received print execution instruction, and monochrome printing is executed according to the changed print setting.

Meanwhile, in the image processing apparatus 100, when the print setting button is pressed in the job list screen W1, it is determined whether the user can change the print condition to a color setting.

In the image processing apparatus 100, when the user can change the print condition to a color setting, a print setting screen W21 (operation screen in which color printing button functions) is displayed on the operation panel 120, based on the received screen transition instruction. Subsequently, in the image processing apparatus 100, when the color printing button is pressed in the print setting screen W21, the print condition of the print data of the selected stored job is changed to a color setting based on the received print execution instruction, and color printing is executed according to the changed print condition.

Meanwhile, in the image processing apparatus 100, when the user cannot change the print condition to a color setting, a print setting screen W22 (operation screen in which color printing button is displayed at a half-brightness and does not function) is displayed on the operation panel 120, based on the received screen transition instruction. Subsequently, in the image processing apparatus 100, when a return button is pressed in the print setting screen W22, the job list screen W1 is displayed on the operation panel 120, based on the received screen transition instruction.

In FIG. 10, the print setting screen W22 in which the color printing button is displayed at a half-brightness is illustrated as an example; however, the present invention is not so limited. As long as the color printing button does not function in the screen, for example, the color printing button may not be displayed.

Print Control Process: Modification

A modification of the process of FIG. 10 is described. In the present modification, in the image processing apparatus 100, when the print condition of the print data of the stored job selected by the user is a color setting, the change propriety determination unit 40 performs the change propriety determination as to whether the user can change the print setting.

Figure 11A:
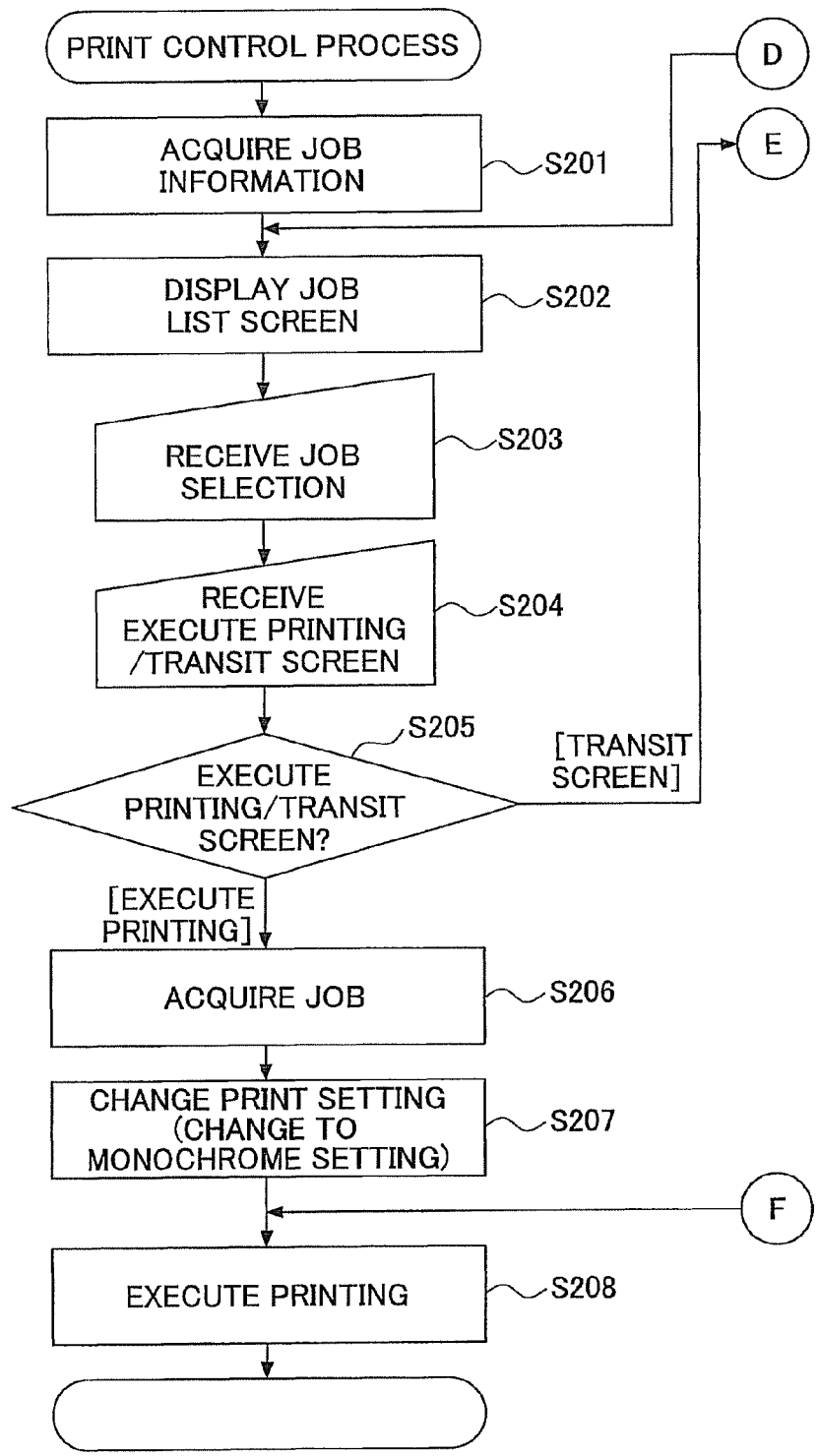
FIGS. 11A and 11B form a flowchart of processing procedures of print control according to a modification of the present invention.
Figure 11B:
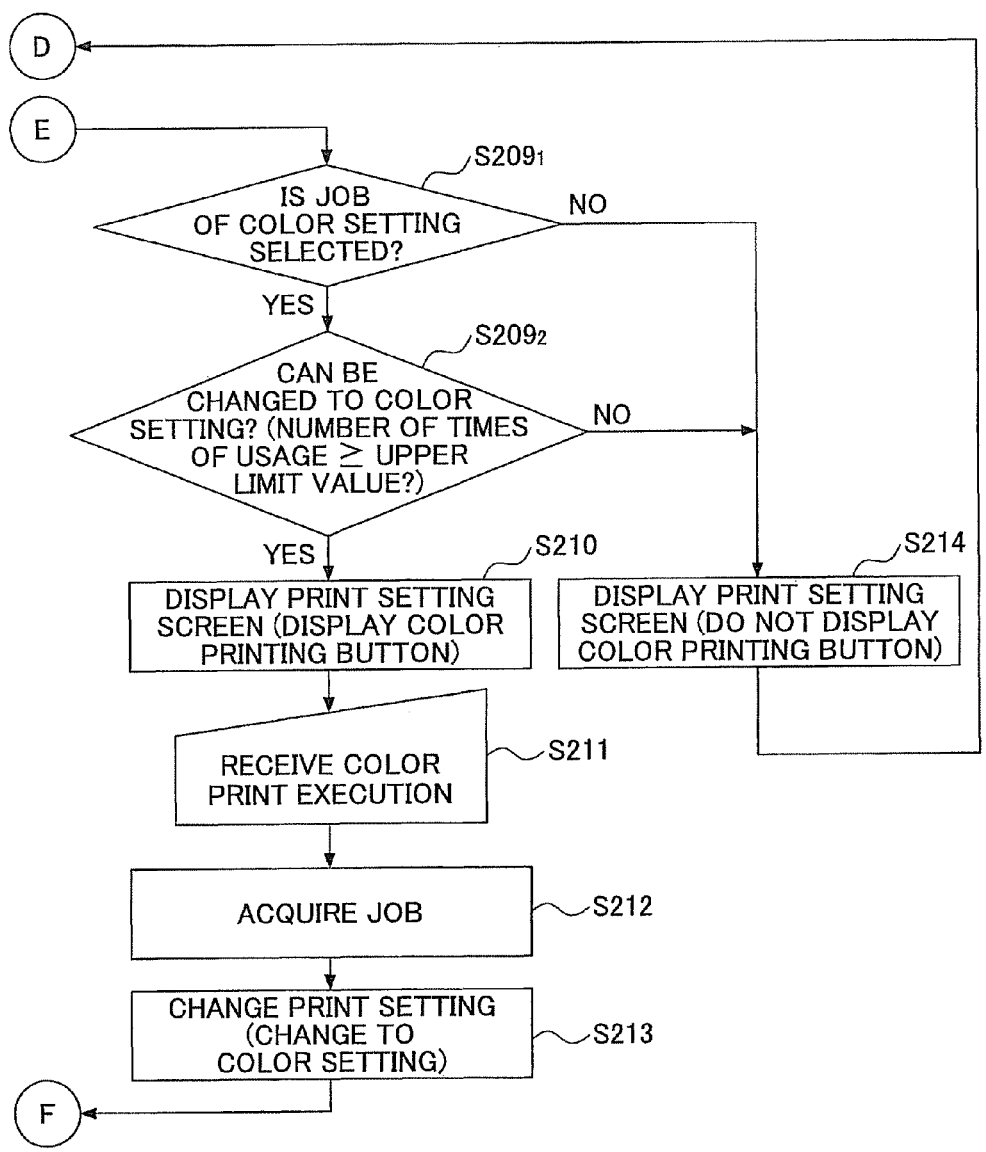

FIGS. 11A and 11B form a flowchart of processing procedures of print control according to the present modification. The difference between the process of FIGS. 11A and 11B and the process of FIG. 10 is steps $S209_1$ and $S209_2$.

As shown in FIGS. 11A and 11B, when it is determined that an instruction to transit to the print setting screen W2 is received (TRANSIT SCREEN in step S205), the screen control unit 10 (input receiving unit) determines whether the print condition of the print data of the selected stored job is a color setting (step $S209_1$). At this time, the screen control unit 10 specifies the corresponding information in the job information 90D previously acquired (in step S201), based on the job identification information of the selected stored job. The screen control unit 10 determines whether the print condition is a color setting, based on the color/monochrome setting information in the specified job information 90D.

When it is determined that the print condition is a color setting (YES in step $S209_1$), the screen control unit 10 instructs the change propriety determination unit 40 to perform the change propriety determination as to whether the user can change the print setting. At this time, the screen control unit 10 passes the user identification information at the time when the user logged in, to the change propriety determination unit 40.

When the user identification information is received, the change propriety determination unit 40 determines whether the user can change the print condition of the print data of the selected stored job to a color setting (step $S209_2$).

Meanwhile, when it is determined that the print condition is a monochrome setting (NO in step $S209_1$), the screen control unit 10 generates, at the screen generating unit 11, the print setting screen W2 in which the color printing button does not function (button is not displayed or is displayed at a half-brightness), and displays the print setting screen W2 on the operation panel 120 (step S214).

As described above, in the present modification, when the print condition of the print data of the stored job selected by the user is a monochrome setting, even if the print setting button is pressed in the job list screen W1, the color printing button does not function in the print setting screen W2 that is displayed after screen transition. This is because a stored job having a print condition of a monochrome setting is supposed to be printed according to the monochrome setting, and in terms of reducing the running cost, it is not preferable to perform print control for allowing the user to change the print condition to color printing.

Print Control Process: Part 2

Figure 12A:
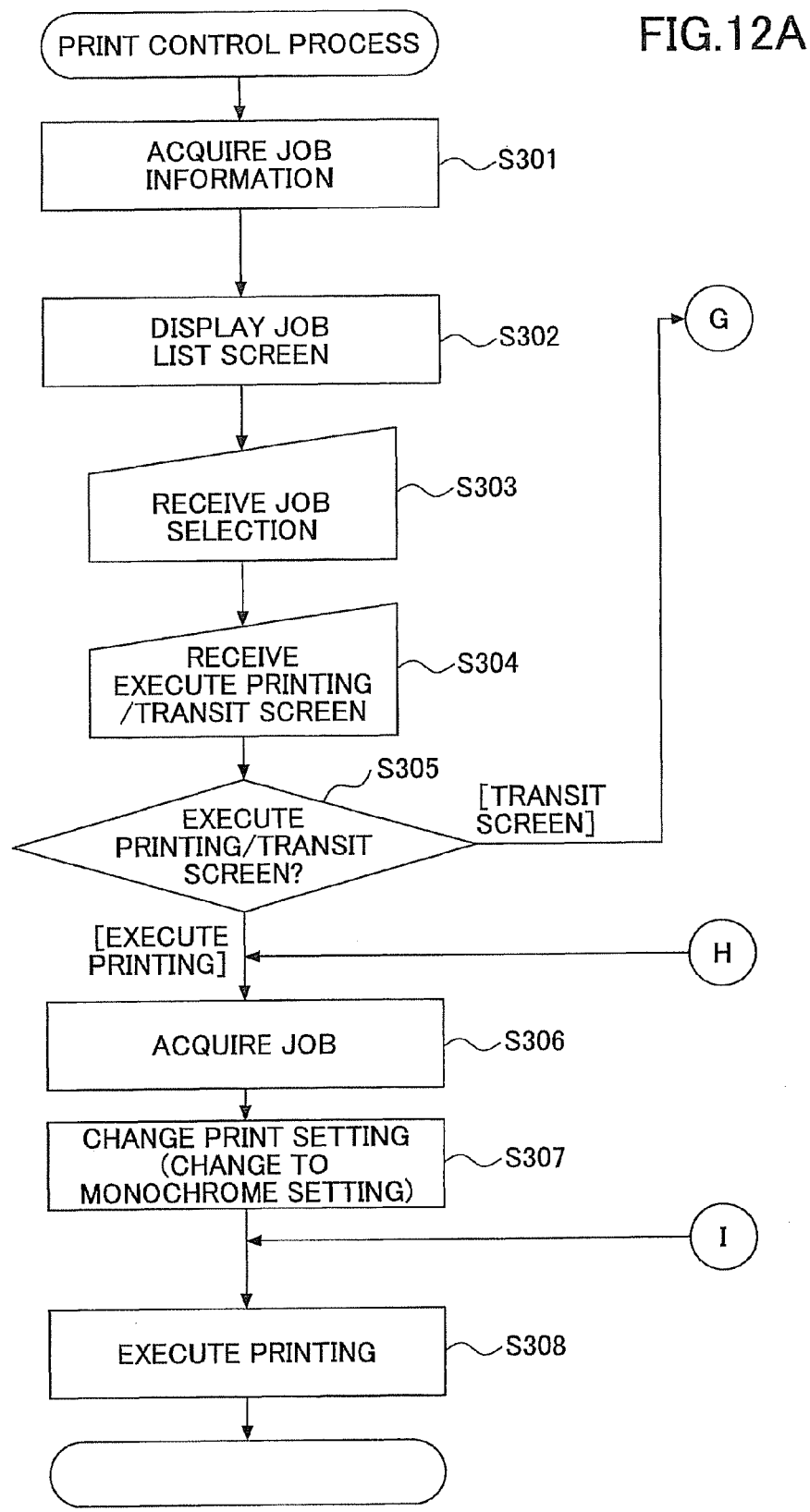
FIGS. 12A and 12B form a flowchart of processing procedures (part 2) of print control according to the second embodiment of the present invention.
Figure 12B:
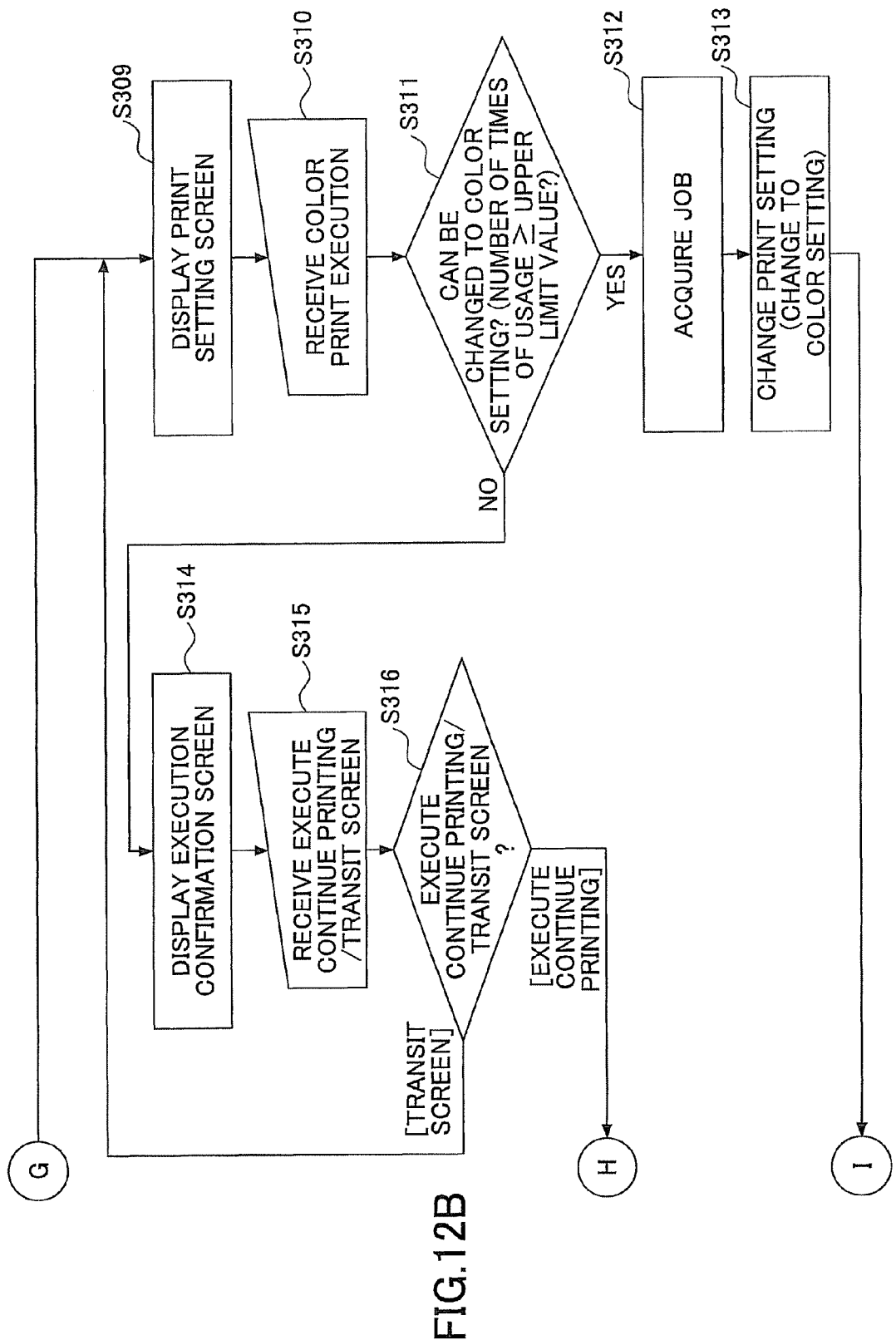

FIGS. 12A and 12B form a flowchart of processing procedures (part 2) of print control according to the second embodiment. The process indicated in FIGS. 12A and 12B is executed when in the image processing apparatus 100, the change propriety determination in print control is executed at the second operation timing described above. Furthermore, steps S301 through S308 in FIG. 12A correspond to steps S101 through S108 in FIG. 5. Therefore, only steps S309 through S316 are described.

As shown in FIGS. 12A and 12B, when it is determined that an instruction to transit to the print setting screen W2 is received (TRANSIT SCREEN in step S305), the screen control unit 10 (input receiving unit) generates the print setting screen W2 by the screen generating unit 11, and displays the print setting screen W2 on the operation panel 120 (step S309).

The screen control unit 10 (input receiving unit) receives an instruction to execute color printing from the print setting screen W2 (step S310). At this time, the input receiving unit 12 receives an instruction to execute color printing based on an operation event performed by pressing the color button. The screen control unit 10 passes the job identification information of the selected stored job to the print setting changing unit 20, and instructs the change propriety determination unit 40 to perform change propriety determination as to whether a user can change the print setting. At this time, the screen control unit 10 passes, to the change propriety determination unit 40, the user identification input when the user logged in.

When the user identification is received, the change propriety determination unit 40 determines whether the user can change the print condition of the print data of the selected stored job to a color setting (step S311). At this time, the change propriety determination unit 40 passes the determination result of the propriety of changing to a color setting to the screen control unit 10.

When the change propriety determination unit 40 determines that the user can change the print condition to a color setting (YES in step S311), the screen control unit 10 instructs the print setting changing unit 20 to execute color printing.

When the instruction is received, the print setting changing unit 20 accesses the job information holding unit 90, and acquires the selected stored job based on the job identification information (step S312). At this time, the print setting changing unit 20 acquires the print data of the selected stored job.

The print setting changing unit 20 changes the print condition of the acquired print data to a color setting (step S313). The print setting changing unit 20 passes the changed print data to the print control unit 30, and instructs to execute color printing.

When the instruction is received, the print control unit 30 analyzes the print data, generates a raster image based on the print condition (color setting), sets the print condition in the plotter 130, and executes printing (step S308).

Meanwhile, when the change propriety determination unit 40 determines that the user cannot change the print condition to a color setting (NO in step S311), the screen control unit 10 (screen generating unit) generates an execution confirmation screen, and displays the execution confirmation screen on the operation panel 120 (step S314).

The screen control unit 10 (input receiving unit) receives, from the execution confirmation screen, an instruction to continue printing or an instruction to transit to the print setting screen W2 (step S315). At this time, the input receiving unit 12 receives an instruction to continue printing or an instruction to transit to the print setting screen W2, based on an operation event performed by pressing either the continue button or the return button.

The screen control unit 10 determines whether an instruction to continue printing or an instruction to transit to the print setting screen W2 has been received (step S316).

When it is determined that an instruction to continue printing is received (EXECUTE CONTINUE PRINTING in step S316), the process proceeds to step S306, and the screen control unit 10 instructs the print setting changing unit 20 to continue monochrome printing.

Meanwhile, when it is determined that an instruction to transit to the print setting screen W2 is received (TRANSIT SCREEN in step S316), the process proceeds to step S309, and the screen control unit 10 displays the print setting screen W2.

Operation Example of Print Control: Part 2

Figure 13:
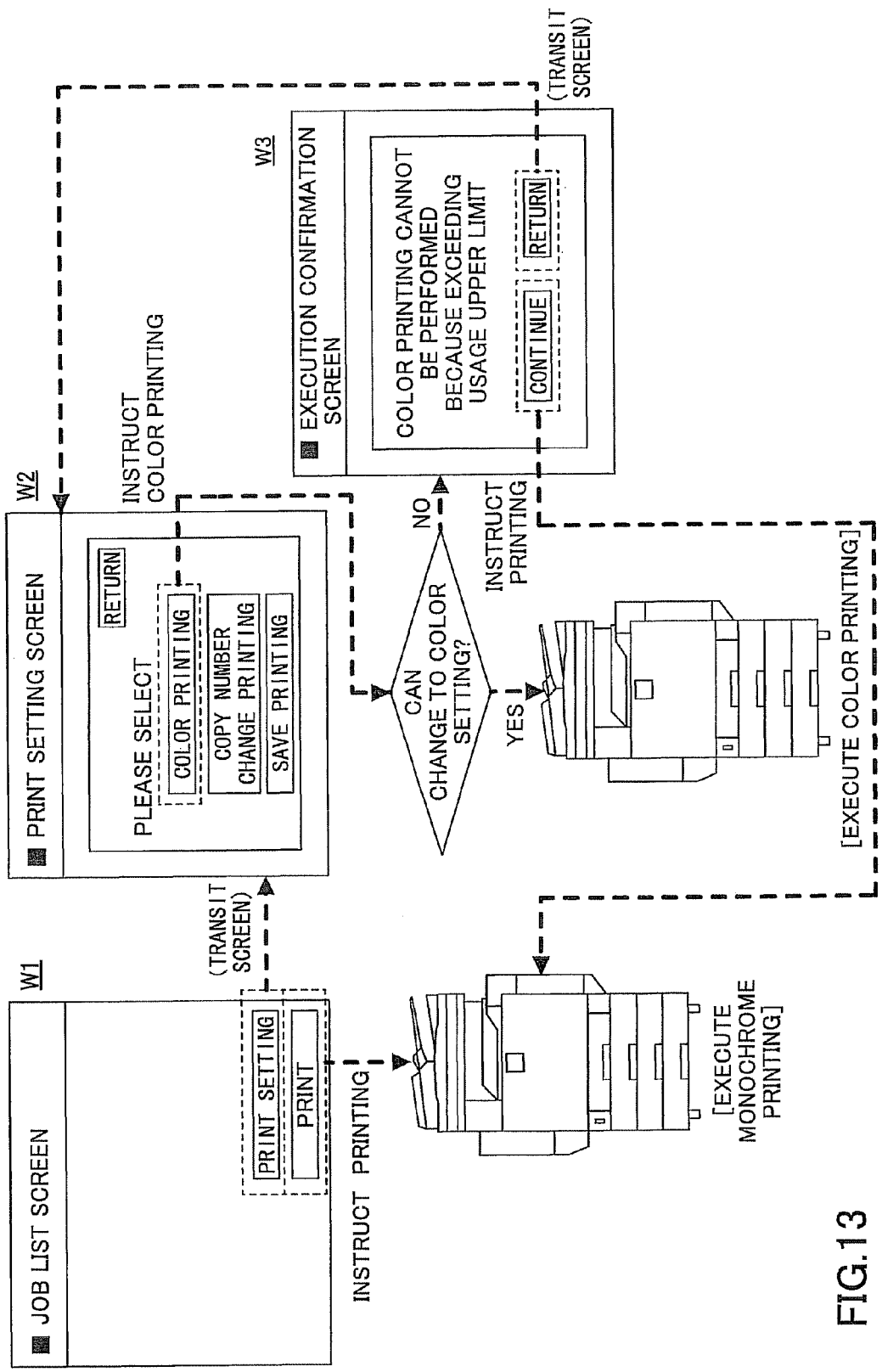
FIG. 13 illustrates an operation example (part 2) of print control according to the second embodiment of the present invention.

FIG. 13 illustrates an operation example (part 2) of print control according to the second embodiment. FIG. 13 illustrates an operation example of displaying screens and printing by the image processing apparatus 100 when the process of FIGS. 12A and 12B is executed.

In the image processing apparatus 100, the job list screen W1 is displayed on the operation panel 120. At this time, when the printing button is pressed in the job list screen W1, in the image processing apparatus 100, the print condition of the print data of the selected stored job is changed to a monochrome setting based on the received print execution instruction, and monochrome printing is executed according to the changed print setting.

Meanwhile, in the image processing apparatus 100, when the print setting button is pressed in the job list screen W1, a print setting screen W2 is displayed on the operation panel 120 based on the received screen transition instruction. Subsequently, in the image processing apparatus 100, when the color printing button is pressed in the print setting screen W2, it is determined whether the user can change the print condition to a color setting.

In the image processing apparatus 100, when the user can change the print condition to a color setting, the print condition of the print data of the selected stored job is changed to a color setting based on the received print execution instruction, and color printing is executed according to the changed print setting.

Meanwhile, in the image processing apparatus 100, when the user cannot change the print condition to a color setting, an execution conformation screen W3 is displayed on the operation panel 120. Subsequently, in the image processing apparatus 100, when the continue button is pressed in the execution conformation screen W3, the print condition of the print data of the selected stored job is changed to a monochrome setting based on the received print continue execution instruction, and monochrome printing is executed according to the changed print setting. Furthermore, in the image processing apparatus 100, when the return button is pressed in the execution conformation screen W3, the print setting screen W2 is displayed on the operation panel 120 based on the received screen transition instruction.

Overview

As described above, in the image processing apparatus 100 according to the present embodiment, the screen control unit 10 controls the display of the operation screens on the operation panel 120 of the image processing apparatus 100, so that there are more operation procedures for color printing compared to monochrome printing in the printing operations. In the image processing apparatus 100, the change propriety determination unit 40 determines whether a usage restriction is to be applied to the user who operated the screen based on the usage restriction information 80D set for each user, and based on the determination result, it is determined whether the user can change the print setting. In the image processing apparatus 100, when the user can change the print setting, the print setting changing unit 20 changes the print setting to color, based on the print execution instruction received from the operation screen. In the image processing apparatus 100, the print control unit 30 executes color printing according to the changed print setting.

Thus, in the image processing apparatus 100 according to the present embodiment, a function that a user is encouraged to use (monochrome printing) is easier to operate and easier to use compared to other functions (color printing). Furthermore, in the present embodiment, when the user's function usage status is not within the usage restriction, the user cannot use the color printing function. Furthermore, even when the user's function usage status is within the usage restriction, because color printing requires more operation procedures compared to monochrome printing, when regular printing is performed, the user is encouraged to use monochrome printing that can be performed with fewer operation procedures and that can be used easily, and to use color printing only when necessary. Thus, with the image processing apparatus 100 according to the present embodiment, the running cost of printing can be reduced, and color printing can also be performed as long as it is within the usage restriction set in advance (the convenience for the user is not deteriorated).

In the present embodiment, the usage restriction information 80D set for each user is used to perform the change propriety determination of the user; however, the present invention is not so limited. For example, the change propriety determination may be performed by using the usage restriction information 80D for managing the usage upper limit information and usage status information in units of devices and in units of groups to which users belong.

Third Embodiment

The present embodiment proposes a technology of determining the operation procedures for performing the printing based on a predetermined condition, controlling the display of operation screens to achieve the determined operation procedures, and performing print control according to the print setting changed via the operation screen. In the following, only the points that are different from the first embodiment are described, and the same points are not further described.

Print Control Function

Figure 14:
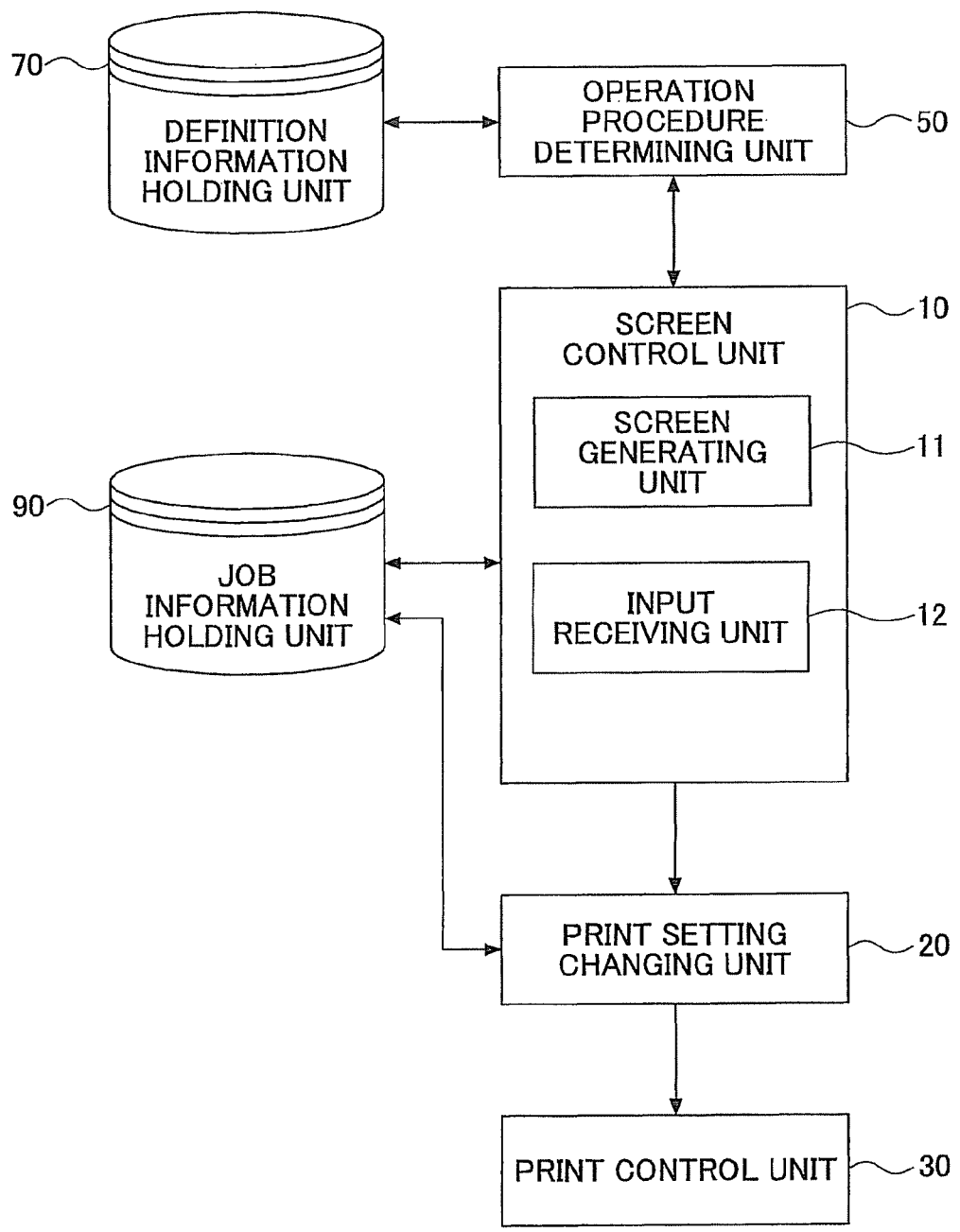
FIG. 14 illustrates a functional configuration of print control according to a third embodiment of the present invention.

FIG. 14 illustrates a functional configuration of print control according to the third embodiment. As shown in FIG. 14, the difference between the present embodiment and the first embodiment is that the present embodiment includes an operation procedure determining unit 50 and a definition information holding unit 70. These functional units also operate in the image processing apparatus 100.

The definition information holding unit 70 is a functional unit for holding information in which operation procedures for performing printing are defined (hereinafter, "definition information"). The definition information holding unit 70 is a predetermined storage area in the storage device 112 provided in the image processing apparatus 100.

A description is given of definition information.

FIG. 15 illustrates an example of data of definition information 70D according to the third embodiment.

As shown in FIG. 15, the definition information 70D includes information items such as determination condition and operation procedure, which are associated with each other in units of conditions for determining the operation procedures. The definition information 70D is held in the definition information holding unit 70.

The determination condition item is for setting information relevant to conditions for determining operation procedures (hereinafter, "determination condition information"), and item values (setting values) include an inequality expression for determining the operation procedure based on the number of pages that can be acquired from the print data of the stored job. The operation procedure item is for setting information indicating operation procedures for printing (hereinafter, "operation procedure information"), and item values include definition data in which operations for printing are defined in a sequential order, such as pressing a GUI button and inputting a value or a character string.

The item values of the above information items may be set in advance with the use of a predetermined tool by the administrator, for example.

Referring back to FIG. 14, the operation procedure determining unit 50 is a functional unit for determining the operation procedures for printing based on predetermined conditions. The operation procedure determining unit 50 is for determining the order of screen operations performed by the user when color-printing the print data of the selected stored job, based on the conditions for determining the operation procedures. In the present embodiment, the determination of the operation procedures is performed based on the definition information 70D. Details are described below.

The operation procedure determining unit 50 accesses the definition information holding unit 70, and acquires the definition information 70D for determining operation procedure set in the definition information 70D. The operation procedure determining unit 50 substitutes a value (number of pages) acquired from the print data of the stored job in condition formulae (inequality expressions) in the determination condition information of the acquired definition information 70D, and identifies the condition formula that satisfies the determination condition. Values such as the number of pages is bibliographic information, and can also be acquired from the job information 90D of the stored job. The operation procedure determining unit 50 identifies the operation procedure information associated with the determination condition information, based on the identified condition formula. The operation procedure determining unit 50 determines the operation procedures for printing, based on the identified operation procedure information. For example, the operation procedure determining unit 50 attempts to determine the operations procedures based on the definition information 70D shown in FIG. 15. At this time, when the selected stored job is one page, the screen operation of pressing the color printing button is determined as the operation procedure for color printing. Meanwhile, when the selected stored job is 50 pages, the screen operations of pressing the color printing button and then inputting user identification information such as a user ID are determined as the operation procedures for color printing. Accordingly, the screen control unit 10 controls the display of operation screens so that the determined operation procedures are implemented.

When there are no operations in a new operation screen included in the determined operation procedures, the screen control unit 10 instructs the print setting changing unit 20 to execute color printing according to the changed print setting. Meanwhile, when there is an operation in a new operation screen included in the determined operation procedures, the screen control unit 10 instructs the screen generating unit 11 to generate an operation screen. The definition information 70D shown in FIG. 15 illustrates an example of an input screen for inputting a user ID (user information) or an administrator's password (administrator information), as a new operation screen. The input screen includes, for example, a text box for receiving input of information, an OK button for instructing to execute matching on the input information (the input value in the text box), and a cancel button for instructing to cancel the input information. The screen control unit 10 displays the input screen generated by the screen generating unit 11 on the operation panel 120. When a matching execution instruction is received by the input receiving unit 12, the screen control unit 10 checks whether the input information matches the user information or the administrator information held in the image processing apparatus 100, and when they match, the screen control unit 10 instructs the print setting changing unit 20 to execute color printing according to the changed print setting.

As described above, the image processing apparatus 100 according to the present embodiment controls the display of the operation screens according to operation procedures determined based on a predetermined condition, so that in the printing operations performed by the user, there are more operation procedures for color printing compared to monochrome printing. Furthermore, based on a print execution instruction received from the operation screen, the print setting is changed to color, and color printing is executed according to the changed print setting.

In the following, a description is given of detailed operations of the print control function (cooperative operations of functional units) according to the present embodiment, with reference to a flowchart indicating processing procedures. In the following, with regard to steps similar to those of the first embodiment, the correspondence relationship is clarified, and only the steps different from those of the first embodiment are described in detail.

Print Control Process

Figure 16A:
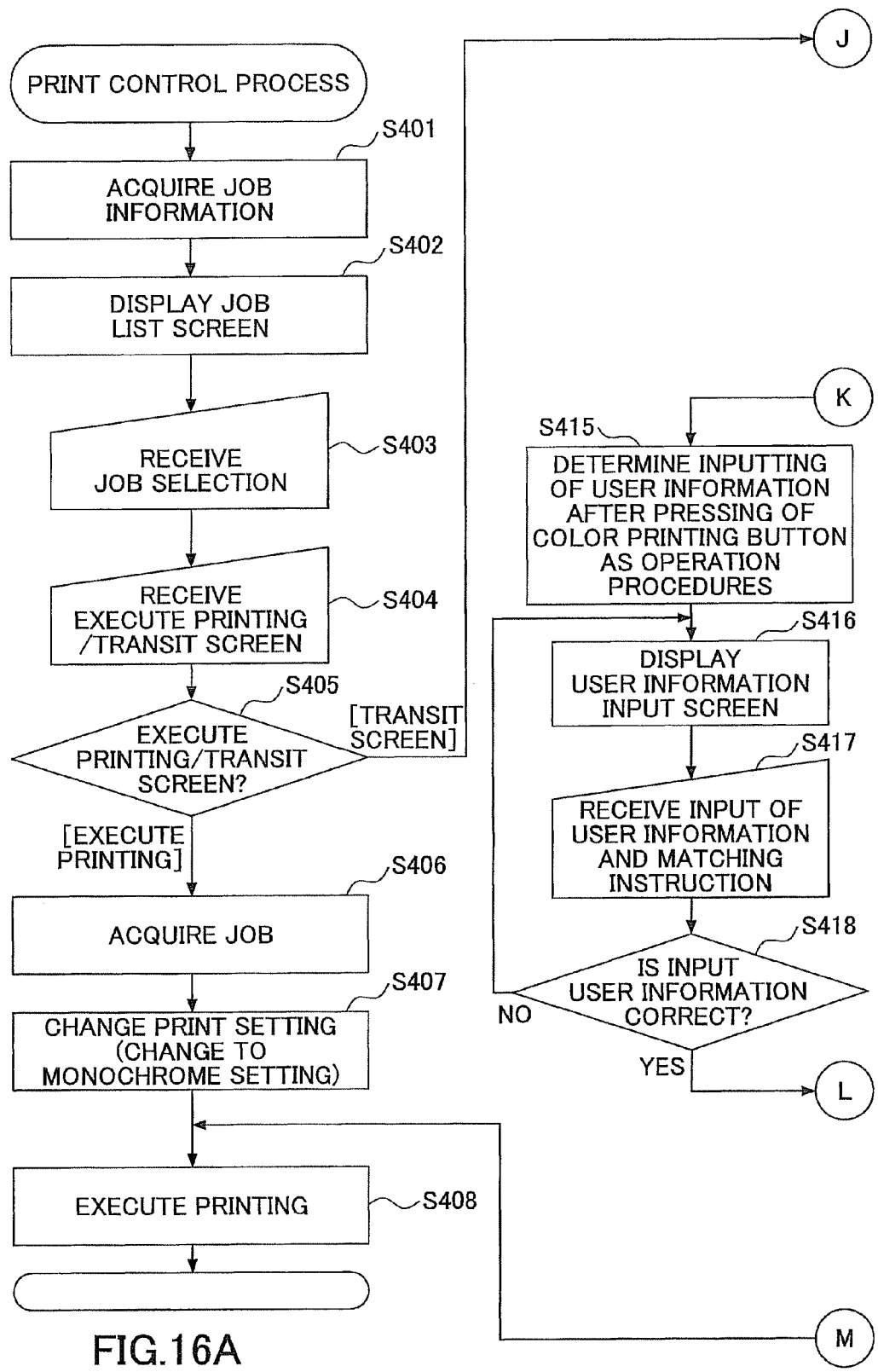
FIGS. 16A and 16B form a flowchart of processing procedures of print control according to the third embodiment of the present invention.
Figure 16B:
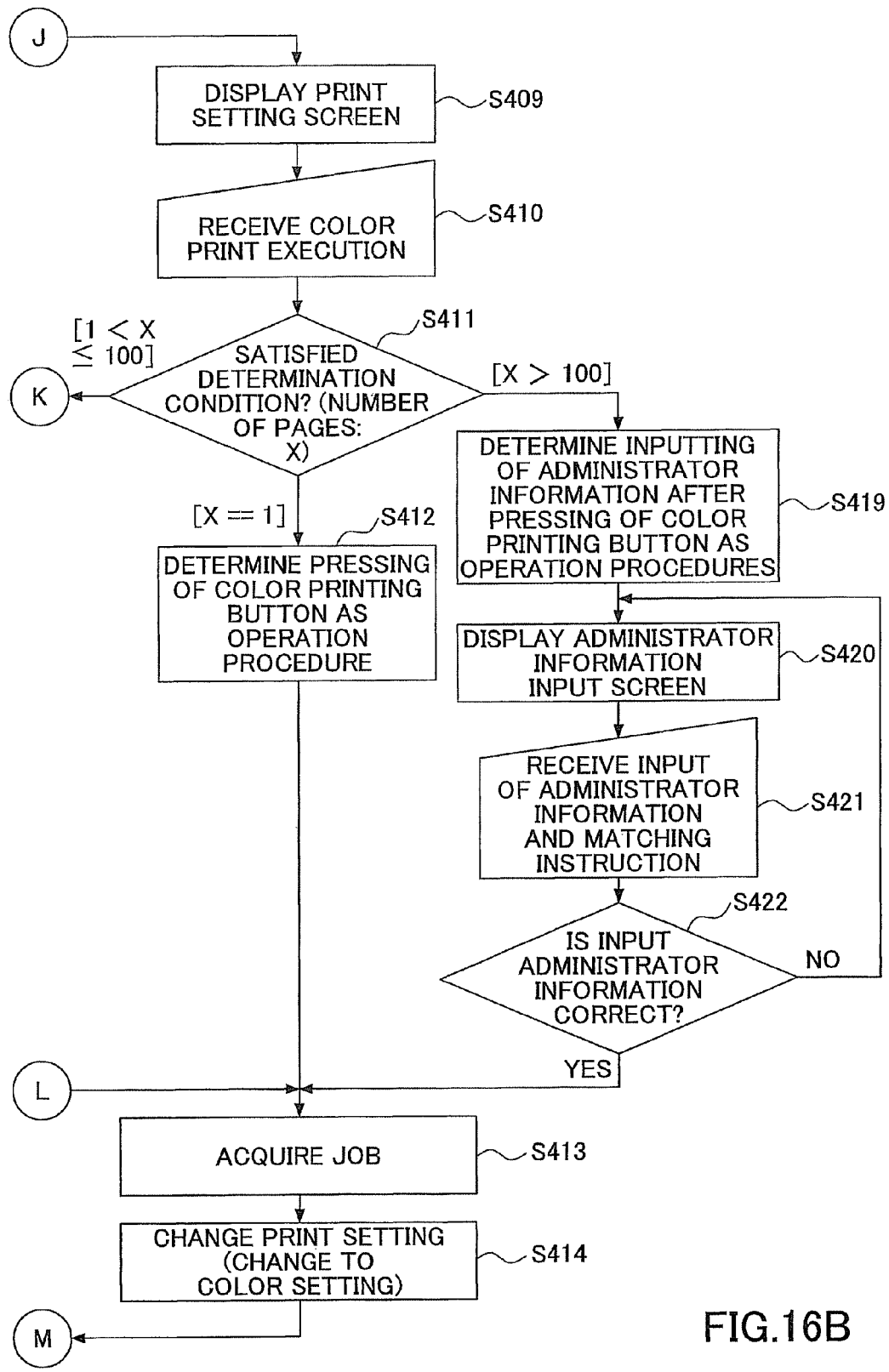

FIGS. 16A and 16B form a flowchart of processing procedures of print control according to the third embodiment.

The process indicated in FIGS. 16A and 16B is executed when the image processing apparatus 100 executes a process of determining the operation procedures in print control. Furthermore, steps S401 through S408 in FIG. 16A correspond to steps S101 through S108 in FIG. 5. Therefore, only steps S409 through S422 are described.

As shown in FIGS. 16A and 16B, when the screen control unit 10 (input receiving unit) determines that an instruction to transit to the print setting screen W2 is received (TRANSIT SCREEN in step S405), the screen generating unit 11 generates the print setting screen W2 and displays the print setting screen W2 on the operation panel 120 (step S409).

The screen control unit 10 (input receiving unit) receives an instruction to execute color printing from the print setting screen W2 (step S410). At this time, the input receiving unit 12 receives an instruction to execute color printing, based on an operation event performed by pressing the color printing button. Furthermore, the screen control unit 10 passes the job identification information of the selected stored job to the operation procedure determining unit 50, and instructs the operation procedure determining unit 50 to determine subsequent operation procedures.

When the job identification information is received, the operation procedure determining unit 50 determines which determination condition set in the definition information 70D is satisfied by the number of pages that can be acquired from the print data of the selected stored job (step S411). At this time, the operation procedure determining unit 50 accesses the definition information holding unit 70, substitutes the number of pages acquired from the print data of the stored job in the condition formulae of determination condition information in the acquired definition information 70D (inequality expression [X==1], [1<X≤100], [X>100], where X is the number of pages), and identifies the condition formula by which the determination condition is satisfied. The operation procedure determining unit 50 identifies the operation procedure information associated to the determination condition information based on the identified condition formula (the operation procedure information being one of "press color printing button", "press color printing button, input user ID", "press color printing button, input administrator password"), and determines the operation procedure for printing, based on the identified operation procedure information.

When the stored job has one page, the operation procedure determining unit 50 determines that the determination condition [X==1] is satisfied (step S411: [X==1]), and determines "press color printing button" corresponding to the determination condition as the operation procedure (step S412). Accordingly, the screen control unit 10 instructs the print setting changing unit 20 to execute color printing.

When the instruction is received, the print setting changing unit 20 accesses the job information holding unit 90, and acquires the selected stored job based on the job identification information (step S413). At this time, the print setting changing unit 20 acquires the print data of the selected stored job.

The print setting changing unit 20 changes the print condition of the acquired print data to a color setting (step S414). The print setting changing unit 20 passes the changed print data to the print control unit 30, and instructs color printing.

When the instruction is received, the print control unit 30 analyzes the print data, generates a raster image based on the print condition (color setting), sets the print condition in the plotter 130, and executes printing (step S408).

When the stored job has more than one page and less than or equal to 100 pages, the operation procedure determining unit 50 determines that the determination condition [1<X≤100] is satisfied (step S411: [1<X≤100]), and determines "press color printing button", "input user ID" corresponding to the determination condition as the operation procedures (step S415). Accordingly, the screen control unit 10 (screen generating unit) generates a user information input screen requesting input of a user ID, and displays the user information input screen on the operation panel 120 (step S416).

The screen control unit 10 (input receiving unit) receives and an input value of user information (user ID) a matching execution instruction from the user information input screen (step S417). At this time, the input receiving unit 12 receives a matching execution instruction for the input user information, based on an operation event performed by pressing the OK button.

The screen control unit 10 determines whether the input user information is correct (step S418). At this time, the screen control unit 10 checks whether the input user information matches the user information held in the image processing apparatus 100. When they match, the screen control unit 10 determines that the input user information is correct.

When the input user information is determined to be correct (YES in step S418), the screen control unit 10 proceeds to step S413, and instructs the print setting changing unit 20 to execute color printing.

When the stored job has more than 100 pages, the operation procedure determining unit 50 determines that the determination condition [X>100] is satisfied (step S411: [X>100]), and determines "press color printing button", "input administrator ID" corresponding to the determination condition as the operation procedures (step S419). Accordingly, the screen control unit 10 (screen generating unit) generates an administrator information input screen requesting input of an administrator ID, and displays the administrator information input screen on the operation panel 120 (step S420).

The screen control unit 10 (input receiving unit) receives and an input value of administrator information (administrator ID) and a matching execution instruction from the administrator information input screen (step S421). At this time, the input receiving unit 12 receives a matching execution instruction for the input administrator user information, based on an operation event performed by pressing the OK button.

The screen control unit 10 determines whether the input administrator information is correct (step S422). At this time, the screen control unit 10 checks whether the administrator information matches the administrator information held in the image processing apparatus 100. When they match, the screen control unit 10 determines that the input administrator information is correct.

When the input administrator information is determined to be correct (YES in step S422), the screen control unit 10 proceeds to step S413, and instructs the print setting changing unit 20 to execute color printing.

Operation Example of Print Control

Figure 17:
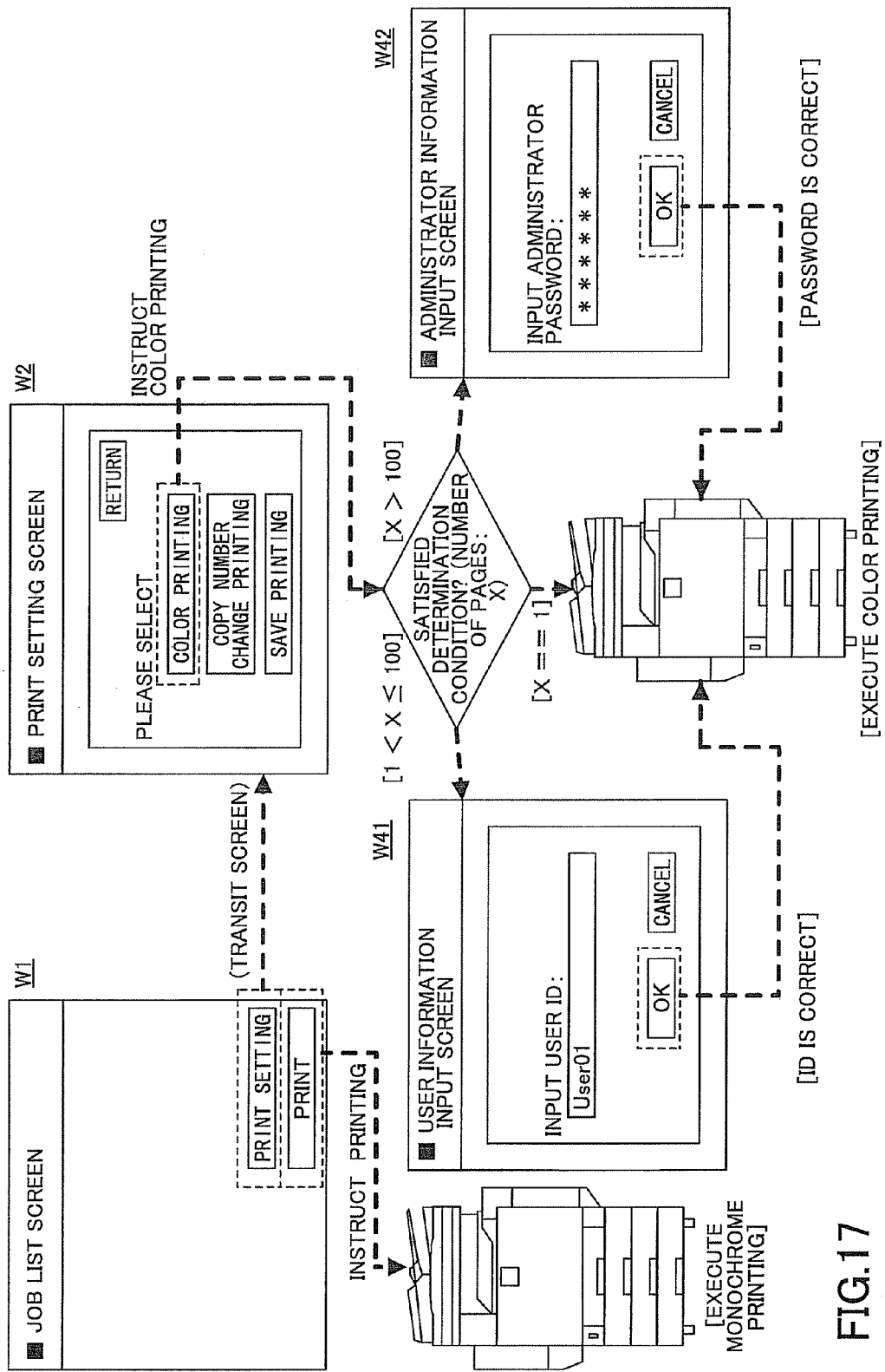
FIG. 17 illustrates an operation example of print control according to the third embodiment of the present invention.

FIG. 17 illustrates an operation example of print control according to the third embodiment. FIG. 17 illustrates an operation example of displaying screens and printing by the image processing apparatus 100 when the process of FIGS. 16A and 16B is executed.

In the image processing apparatus 100, the job list screen W1 is displayed on the operation panel 120. At this time, when the printing button is pressed in the job list screen W1, in the image processing apparatus 100, the print condition of the print data of the selected stored job is changed to a monochrome setting based on the received print execution instruction, and monochrome printing is executed according to the changed print setting.

Meanwhile, in the image processing apparatus 100, when the print setting button is pressed in the job list screen W1, a print setting screen W2 is displayed on the operation panel 120 based on the received screen transition instruction. Subsequently, in the image processing apparatus 100, when the color printing button is pressed in the print setting screen W2, subsequent operation procedures are determined according to definitions of operation procedures corresponding to the determination conditions set in advance.

In the image processing apparatus 100, when the stored job has one page, "press color printing button" corresponding to the determination condition [number of pages: X=1] that is satisfied, is determined as the operation procedure. Accordingly, in the image processing apparatus 100, based on the received print execution instruction, the print condition of the print data of the selected stored job is changed to a color setting, and color printing is executed according to the changed print setting.

Furthermore, in the image processing apparatus 100, when the stored job has more than one page and less than or equal to 100 pages, "press color printing button", "input user ID" corresponding to the determination condition [1<number of pages: X≤100] that is satisfied, are determined as the operation procedures. Accordingly, in the image processing apparatus 100, a user information input screen W41 is displayed on the operation panel 120. Subsequently, in the image processing apparatus 100, when the user ID is input to the user information input screen W41, and the OK button is pressed, matching is performed on the input user ID. As a result, in the image processing apparatus 100, when the user ID is determined to be correct, based on the received print execution instruction, the print condition of the print data of the selected stored job is changed to a color setting, and color printing is executed according to the changed print setting.

Furthermore, in the image processing apparatus 100, when the stored job has more than 100 pages, "press color printing button," "input administrator password" corresponding to the determination condition [number of pages: X>100] that is satisfied, are determined as the operation procedures. Accordingly, in the image processing apparatus 100, an administrator information input screen W42 is displayed on the operation panel 120. Subsequently, in the image processing apparatus 100, when the administrator password is input to the administrator information input screen W42, and the OK button is pressed, matching is performed on the input administrator password. As a result, in the image processing apparatus 100, when the administrator password is determined to be correct, based on the received print execution instruction, the print condition of the print data of the selected stored job is changed to a color setting, and color printing is executed according to the changed print setting.

Overview

As described above, in the image processing apparatus 100 according to the present embodiment, the screen control unit 10 determines the operation procedures based on the determination conditions set in the definition information 70D, and determines the operation procedures for printing from among the operation procedures defined in the definition information 70D. In the image processing apparatus 100, the screen control unit 10 controls the display of the operation screens on the operation panel 120 of the image processing apparatus 100, so that there are more operation procedures for color printing compared to monochrome printing in the printing operations by the user according to the determined operation procedures. In the image processing apparatus 100, the print setting changing unit 20 changes the print setting to color based on the print execution instruction received from the operation screen. In the image processing apparatus 100, the print control unit 30 executes color printing according to the changed print setting. Thus, with the image processing apparatus 100 according to the present embodiment, the running cost of printing can be reduced, and color printing can also be performed as long as the stored job to be printed satisfies a predetermined condition (the convenience for the user is not reduced).

In the present embodiment, the operation procedures are determined with the use of the definition information 70D includes determination conditions based on the number of pages of the stored job; however, the present invention is not so limited.

For example, the definition information 70D in which determination conditions based on users or devices are set may be used to determine the operation conditions. Accordingly, in the image processing apparatus 100, for example, operation procedures such that the operation for color printing becomes complex are determined for a specific user or a specific device, and the operation screens for color printing are controlled accordingly.

Furthermore, the definition information 70D in which determination conditions based on the number of times of usage in units of users or devices are set may be used to determine the operation conditions. Accordingly, in the image processing apparatus 100, for example, when the number of times of usage is high, operation procedures such that the operation for color printing becomes complex are determined, and the operation screens for color printing are controlled accordingly.

Furthermore, the definition information 70D in which determination conditions based on the number of copies in units of users or devices are set may be used to determine the operation conditions. Accordingly, in the image processing apparatus 100, for example, when the number of copies is one, the printing operation is likely to be for an individual, and therefore operation procedures such that the operation for color printing becomes complex are determined, and the operation screens for color printing are controlled accordingly.

Furthermore, the definition information 70D in which determination conditions based on the time-of-day of using the printing function are set may be used to determine the operation conditions. Accordingly, in the image processing apparatus 100, for example, in a time-of-day when the usage frequency is high, operation procedures such that the operation for color printing becomes complex are determined, and the operation screens for color printing are controlled accordingly.

In the above-described embodiments, the print control function is implemented by having a CPU included in the image processing apparatus 100 execute a program in which the processing procedures described above with reference to drawings are coded in a programming language appropriate for the operation environment (platform).

The above program may be stored in the computer-readable recording medium 114a. Accordingly, the above program may be installed in the image processing apparatus 100 via the external storage I/F 114. Furthermore, the image processing apparatus 100 includes the network I/F 113, and therefore the program may be downloaded via a telecommunication line and installed in the image processing apparatus 100.

Modification

Furthermore, in the above embodiments, the print control system 1 in which the image processing apparatus 100 stores a print job received from the information processing apparatus 200 is described; however, the present invention is not so limited. For example, the print control system 1 may be as illustrated in FIG. 18.

Figure 18:
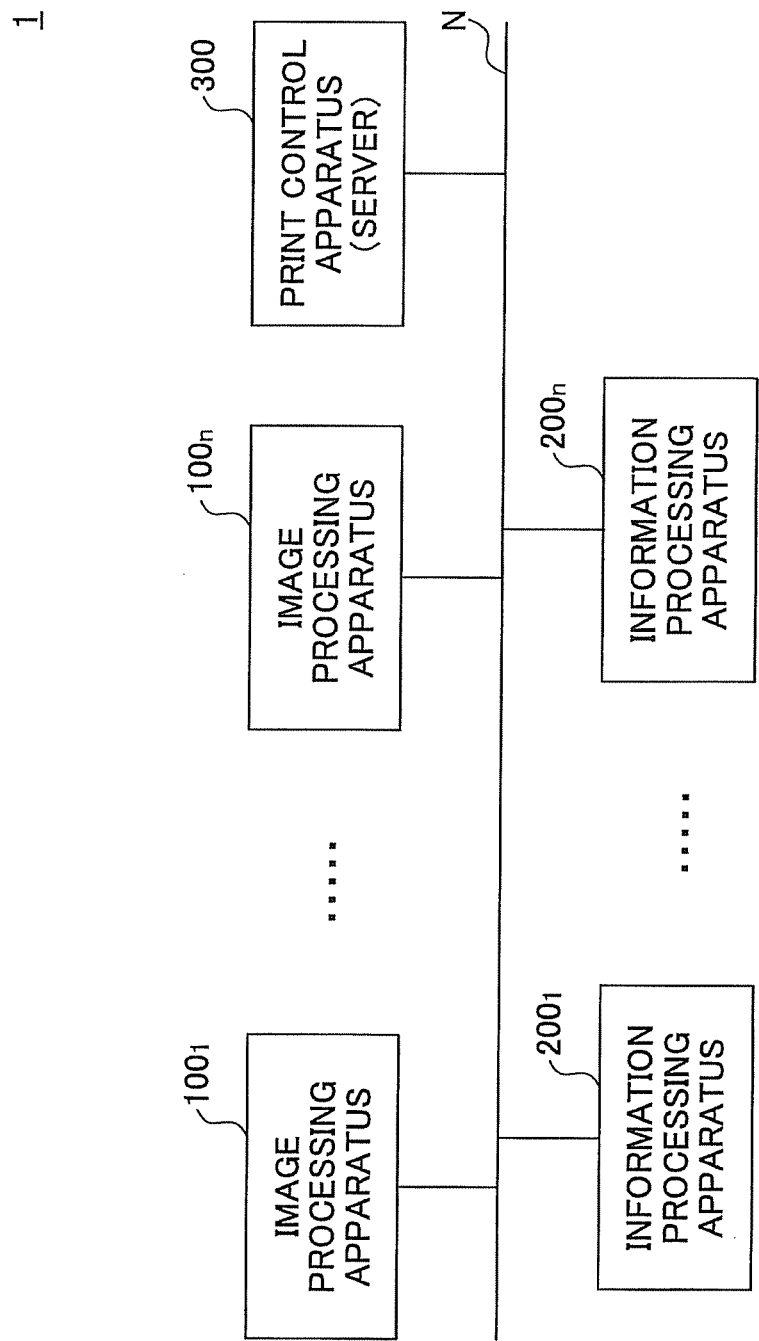
FIG. 18 illustrates the print control system according to a modification of the present invention.

FIG. 18 illustrates the print control system 1 according to the modification.

In FIG. 18, in addition to the image processing apparatus 100 and the information processing apparatus 200, a print control apparatus 300 is connected via the data transmission path N such as a network.

The print control apparatus 300 is a server device (pull print server) having a print control function of holding a print job received from the information processing apparatus 200 in a predetermined storage area, and transmitting the print data to the image processing apparatus 100 in response to a print execution request. For example, the print control apparatus 300 is an information processing apparatus such as a PC.

In the print control system 1 according to the present modification, the following printing service is provided to users. For example, when a print job is transmitted from the information processing apparatus 200 to the print control apparatus 300, the print control apparatus 300 stores and accumulates the data of the received print job in a predetermined storage area. Meanwhile, the image processing apparatus 100 displays the job list screen W1 based on the job information 90D acquired from the print control apparatus 300, and when a job selection and a print execution request is received from a user, the image processing apparatus 100 acquires the print data of the selected stored job from the print control apparatus 300, and executes the printing of the acquired data. Accordingly, the user obtains the desired printing results.

FIG. 19 illustrates a functional configuration of print control according to the modification.

As shown in FIG. 19, in the print control function according to the present modification, the print control apparatus 300 includes the job information holding unit 90. Accordingly, in the image processing apparatus 100, the job information 90D to be used by the screen control unit 10 and print data used by the print setting changing unit 20 are received from the print control apparatus 300. In this case, it is assumed that the image processing apparatus 100 holds network setting information (for example, IP addresses (Internet Protocol address) for accessing the image processing apparatus 100 and URI (Uniform Resource Identifier) for accessing data.

As described above, in the present modification, the job information 90D and the print data are held in an external device, but the same effects as the above embodiments can be achieved in the image processing apparatus 100 according to the present modification.

In the above embodiments, descriptions are given of a print control function for controlling monochrome printing for reducing the running cost and color printing in consideration of the user convenience; however, the present invention is not so limited. For example, the print control function may control single-sided printing and double-sided printing, or control combined printing and non-combined printing. That is to say, in the print control system 1 for reducing the running cost by performing compulsory double-sided printing or compulsory combined printing, there are more operation procedures for performing single-sided printing or non-combined printing compared to compulsory double-sided printing or compulsory combined printing when executing printing.

Furthermore, the display control of operation screens described in the above embodiments is not limited to being applied to an image processing function such as a printing function. For example, the display of operation screens may be controlled so that compared to a function or a setting which the administrator desires to encourage the user to use, there are more operation procedures required for other functions or settings. That is to say, the control may be applied to a system for providing an environment in which a function or a setting which the user is to be encouraged to use is easier to use than other functions or settings.

According to an aspect of the present invention an image processing apparatus, a print control method, and a recording medium storing print control program are provided, in which the display of the operation screens is controlled, so that in the printing operations, there are more operation procedures for color printing compared to monochrome printing, the print setting is changed to monochrome or color based on the print execution instruction received from the operation screen, and monochrome printing or color printing is executed according to the changed print setting, so that a function which the user is encouraged to use is easier to operate and use compared to other functions.

The present invention is not limited to the specific embodiments described herein, and variations and modifications may be made without departing from the scope of the present invention.

The present application is based on Japanese Priority Patent Application No. 2011-090717, filed on Apr. 15, 2011, the entire contents of which are hereby incorporated herein by reference.

What is claimed is:

1. An image processing apparatus comprising:
a display unit configured to display a screen;
an input receiving unit configured to receive an operation input by a user;
a screen control unit configured to control display, on the display unit, of a print setting screen by which the input receiving unit can receive a color setting instruction of a print setting of a job, when the display unit is displaying an operation screen by which the input receiving unit can receive a print execution instruction of the job or a display instruction to display the print setting screen of the job, and the input receiving unit receives the display instruction to display the print setting screen;
a setting change unit configured to change the print setting of the job to a monochrome setting when the input receiving unit receives the print execution instruction of the job, and to change the print setting of the job to a color setting when the input receiving unit receives a color setting instruction for the print setting of the job; and
a print control unit configured to execute monochrome printing on the job for which the input receiving unit has received the print execution instruction of the job, and to execute color printing on the job for which the input receiving unit has received the color setting instruction of the print setting of the job.

2. The image processing apparatus according to claim 1, wherein
the screen control unit is configured to display, based on job information of the job, the operation screen including a job list screen indicating the job, by which the input receiving unit can receive a selection instruction of the job, and
the print control unit is configured to execute printing of the job for which the input receiving unit has received the selection instruction, among jobs in the displayed job list screen.

3. The image processing apparatus according to claim 1, further comprising:
a change propriety determination unit configured to determine change propriety of the print setting according to a usage restriction, based on usage restriction information for applying the usage restriction on a function according to a usage upper limit value, wherein
the screen control unit is configured to changes a display format of a display element used for receiving a print execution instruction on the print setting screen, based on a determination result of the change propriety determination unit, when the input receiving unit receives the display instruction to display the print setting screen when the operation screen is being displayed.

4. The image processing apparatus according to claim 3, wherein
the screen control unit is configured such that the screen control unit,
displays a display element used for receiving a print execution instruction on the print setting screen, when the change propriety determination unit determines that the print setting can be changed, and
does not display, or displays at a half-brightness, a display element used for receiving a print execution instruction of the color setting instruction on the print setting screen, when the change propriety determination unit determines that the print setting cannot be changed according to the usage restriction.

5. The image processing apparatus according to claim 3, wherein
the change propriety determination unit is configured to determines the change propriety of the print setting when the selected job has a color setting when a print execution instruction is received, and
the screen control unit is configured such that the screen control unit does not display, or displays at a half-brightness, a display element used for receiving a print execution instruction of the color setting instruction on the print setting screen, when the selected job has a monochrome setting when a print execution instruction is received.

6. The image processing apparatus according to claim 3, wherein
the screen control unit is configured such that the screen control unit,
displays the print setting screen when the input receiving unit receives the display instruction to display the print setting screen when the operation screen is being displayed, and
controls screen transition to an execution confirmation screen for prompting to execute color printing according to the received print execution instruction of the color setting instruction or to confirm print execution, based on a determination result of the change propriety determination unit, when a print execution instruction of the color setting instruction is received from the print setting screen.

7. The image processing apparatus according to claim 6, wherein
the screen control unit is configured such that the screen control unit,
instructs the setting change unit to execute printing after the print setting is changed to color, when the change propriety determination unit determines that the print setting can be changed, and
displays the execution confirmation screen when the change propriety determination unit determines that the print setting cannot be changed according to the usage restriction, and instructs the setting change unit to execute printing after the print setting is changed to the monochrome setting when an instruction to continue printing is received from the execution confirmation screen.

8. The image processing apparatus according to claim 3, wherein
the change propriety determination unit
compares an upper limit of times of usage of a function set in the usage restriction information and a present number of times of usage, and
when the present number of times of usage is less than the upper limit of times of usage, the change propriety determination unit determines that the print setting can be changed, and
when the present number of times of usage is greater than or equal to the upper limit of times of usage, the change propriety determination unit determines that the print setting cannot be changed according to the usage restriction.

9. The image processing apparatus according to claim 1, further comprising:
an operation procedure determination unit configured to determine operation procedures for printing based on definition information defining procedures of the printing operations, wherein
the screen control unit controls the display of screens on the display unit so that the operation procedures determined by the operation procedure determination unit are implemented.

10. The image processing apparatus according to claim 9, wherein
the operation procedure determination unit substitutes a value acquired from the print data or job information of the job in condition formulae set in the definition information, and determines the operation procedures for printing based on operation procedure information defined in the definition information corresponding to a condition formula satisfying a condition.

11. The image processing apparatus according to claim 1, wherein
the screen control unit is configured such that the screen control unit,
displays the print setting screen when the input receiving unit receives the display instruction to display the print setting screen when the operation screen is being displayed, and
displays an input screen for inputting user information or administrator information when a print execution instruction of the color setting instruction is received from the print setting screen, and
wherein the setting change unit changes the print setting to color, when input information from the input screen matches user information or administrator information held in a predetermined storage area in advance.

12. A print control method performed by an image processing apparatus including a display unit and an input receiving unit, the print control method comprising:
receiving, at the input receiving unit, an operation input by a user;
controlling display, on the display unit, of a print setting screen by which the input receiving unit can receive a color setting instruction of a print setting of a job, when the display unit is displaying an operation screen by which the input receiving unit can receive a print execution instruction of the job or a display instruction to display the print setting screen of the job, and the input receiving unit receives the display instruction to display the print setting screen;

changing the print setting of the job to a monochrome setting when the input receiving unit receives the print execution instruction of the job;

changing the print setting of the job to a color setting when the input receiving unit receives a color setting instruction for the print setting of the job;

executing monochrome printing or color printing on the job for which the input receiving unit has received the print execution instruction of the job; and executing color printing on the job for which the input receiving unit has received the color setting instruction of the print setting of the job.

13. An image processing apparatus comprising:

a display unit configured to display a screen;

an input receiving unit configured to receive an input operation by a user;

a screen control unit configured to control display, on the display unit, of a setting screen by which the input receiving unit can receive a setting instruction to set a first execution condition, which is at least one of execution conditions of the job, as a first setting, when the display unit is displaying an operation screen by which the input receiving unit can receive an execution instruction of the job or a display instruction to display the setting screen of the execution conditions of the job, and the input receiving unit receives the display instruction to display the setting screen;

a setting change unit configured to change the first execution condition of the job to a second setting when the input receiving unit receives the execution instruction of the job, and to change the first execution condition of the job to the first setting when the input receiving unit receives the setting instruction for execution conditions of the job; and an execution control unit configured to execute the job based on the second setting, for which the input receiving unit has received the execution instruction of the job, and to execute the job based on the first setting, for which the input receiving unit has received the setting instruction.

* * * * *